US006867942B2

(12) United States Patent
Albrecht et al.

(10) Patent No.: US 6,867,942 B2
(45) Date of Patent: Mar. 15, 2005

(54) STORAGE DEVICE MOUNTED IN PORTABLE DATA STORAGE MEDIA TYPE CARTRIDGES

(75) Inventors: Thomas Robert Albrecht, San Jose, CA (US); John Ray Blair, Tucson, AZ (US); Allen Ronald Cox, Eastleigh (GB); David Michael Davis, Tucson, AZ (US); Paul Merrill Greco, Tucson, AZ (US); James Mitchell Karp, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 09/842,030

(22) Filed: Apr. 26, 2001

(65) Prior Publication Data

US 2002/0159182 A1 Oct. 31, 2002

(51) Int. Cl.[7] .......................... G11B 17/00; G11B 23/02
(52) U.S. Cl. ..................... 360/69; 360/132; 242/338; 439/67; 439/374
(58) Field of Search ..................... 360/69, 71, 92, 360/94, 132, 133; 242/336, 337, 338, 338.2, 348.2, 338.4; 439/345, 374, 67

(56) References Cited

U.S. PATENT DOCUMENTS

| 5,055,947 A | 10/1991 | Satoh ........................... 360/62 |
| 5,146,375 A | 9/1992 | Satoh et al. .................. 360/92 |
| 5,214,550 A | * 5/1993 | Chan ....................... 360/97.01 |
| RE34,369 E | 9/1993 | Darden et al. .............. 439/377 |
| 5,253,246 A | 10/1993 | Leonhardt et al. .......... 369/291 |
| 5,371,644 A | * 12/1994 | Hoge et al. .................. 360/132 |
| 5,970,030 A | 10/1999 | Dimitri et al. ................. 369/36 |
| 6,154,360 A | 11/2000 | Kaczeus, Sr. et al. ...... 361/685 |

FOREIGN PATENT DOCUMENTS

JP 7220464 8/1995 ........... G11B/33/12

* cited by examiner

Primary Examiner—Andrew L. Sniezek
(74) Attorney, Agent, or Firm—John H. Holcombe

(57) ABSTRACT

A data storage cartridge having an data storage device, such as an encased magnetic disk drive assembly, is, in one embodiment, of generally an exterior dimensional form factor of a tape cartridge having a leader block with a hole therethrough for engagement by a threading pin. To distinguish the cartridge from a tape cartridge, the cartridge shell comprises a blocking portion at the location of the leader block hole. A transfer station both identifies the cartridge and indicates the presence of the cartridge at an end of travel in a cartridge receiver, employing an optical source and an opposed sensor directed toward the leader block hole when a cartridge is at the end of travel. In another embodiment, an encased magnetic disk drive assembly is supported and mounted in a cartridge shell by a shock mount. A flex cable interconnects the rear of the encased magnetic disk drive assembly with an external data transfer interface at the opposite side of the cartridge for data transfer with respect to a transfer station and to provide mechanical isolation.

42 Claims, 23 Drawing Sheets

STORAGE DEVICE MOUNTED IN PORTABLE DATA STORAGE MEDIA TYPE CARTRIDGES

CROSS-REFERENCE TO RELATED APPLICATION

U S. Pat. No. 6,540,528 filed on even date herewith relates to a removable electrical connection employing compression, and a transfer station for removably electrically coupling with respect to a portable cartridge.

FIELD OF THE INVENTION

This invention relates to portable cartridges of the type that are employed for data storage, such as cartridges that typically contain a data storage media, e.g., magnetic tape, and typically may be handled by a robot in an automated data storage library, for insertion into a data storage drive for reading and/or writing data on the data storage media. The invention additionally relates to the stations and automated data storage libraries handling such portable cartridges.

BACKGROUND OF THE INVENTION

Data storage cartridges typically comprise a data storage media, such as magnetic tape, which are inserted into a separate data storage drive so that data may be read and/or written on the data storage media. Such cartridges are convenient means of storing large quantities of data which are accessed occasionally. They are particularly useful in automated data storage libraries which can contain large numbers of the cartridges on storage shelves and employ a robot accessor to access a cartridge when needed and deliver the cartridge to a data storage drive.

The cartridge must be open or opened so that the media can be inserted into the data storage drive.

In the case of a single reel magnetic tape cartridge, the tape may have a leader block which is engaged by a threading pin, and then threaded into the data storage drive. If the tape is in a dual reel cartridge, an expanse of the tape must be inserted into the data storage drive and unwound from one reel and onto another reel of the cartridge. If the data storage media is an optical disk, often the entire disk must be removed from the cartridge and inserted in the data storage drive.

Removable magnetic disks in the form of floppy disks are ubiquitous, and removable hard disks have been tried, most notably, as removable disk packs. In each instance, the cartridge must be open, or opened, so that the disk may be contacted by a read/write head. For example, U.S. Pat. No. 5,253,246 illustrates various types of media in a common form factor cartridges, but all are open or openable in order to provide access to the media.

An open, or openable, cartridge allows debris to enter the data storage drive—cartridge interface. As the result, technologies that are employed are those that can tolerate such debris, severely limiting the data density of the media. Portable magnetic disk drives, particularly, emphasize high data capacity and high data access performance in a small size, requiring both high data density and precise tolerances. As is known to those of skill in the art, portable magnetic disk drives are therefore typically encased to prevent the introduction of debris into the drive. Any opening of the drive would likely result in failure of the drive. Further, robot accessors occasionally drop a cartridge, or misplace a cartridge such that it is handled roughly, and manual handling is also likely to result in an occasional dropped or roughly handled cartridge. Detachable data storage devices are known, for example, in U.S. Pat. Re. No. 34,369, or Japanese Patent 7-220464, but such devices are not truly portable, in that they are not capable of rough handling such as would be caused either by a robot accessor or by manual handling. U.S. Pat. No. 6,154,360 employs three shock pads and a flex circuit connecting a PCB connector at the back of a disk drive to a cable connector of the cartridge. The PCB connector is at the end of the disk drive which faces the cable connector of the cartridge, so that the flex circuit has little lateral flexibility, requiring a plurality of slits along its length to provide a measure of flexibility.

Tape technology data access, particularly, is largely linear, in that the tape must be wound or unwound from a reel to access data not presently at a tape head. Data access is thus linear and is slow as compared to the memory systems and the high speed hard disk drives that comprise the random access of main storage, for example, of computer systems.

Typically, once data from a data storage cartridge is accessed, other data from the same cartridge is subsequently accessed and/or the data is altered and rewritten on the data storage cartridge. The efficiency of the data transfer is thus hampered by the linear data access of the data storage cartridge media.

SUMMARY OF THE INVENTION

It is an object of the present invention to provide a high density, random access data storage portable cartridge which is distinguishable from other portable cartridges, and a means of distinguishing and accessing data stored in such a cartridge.

Another object of the present invention is to provide a portable cartridge capable of high density, random access data storage that is capable of rough handling.

In one embodiment, the data storage cartridge is of generally an exterior dimensional form factor of a tape cartridge having a leader block, the leader block comprising a hole therethrough for engagement by a threading pin. The data storage cartridge comprises an alternative data storage device, such as a magnetic disk drive assembly, an optical disk drive assembly, or a non-volatile solid state memory. To distinguish the cartridge from a tape cartridge and yet be usable in an automated data storage library or other device which also accepts tape cartridges, the cartridge shell has substantially an identical exterior dimensional form factor as the tape cartridge with the leader block, and comprises a blocking portion on at least one side of the location of the leader block hole.

A transfer station in accordance with an embodiment of the present invention, having a receiver into which the cartridge is inserted, both identifies the data storage cartridge, and indicates the presence of the data storage cartridge at an end of travel in the receiver, employing an optical source directed toward the location of the leader block hole when a cartridge is at the end of travel in the receiver, and a sensor positioned at the location of the leader block hole at the opposite side of the cartridge from the optical source. The transfer station thus senses the blockage of the optical source by a cartridge shell blocking portion, thereby identifying the differentiated identification of the data storage cartridge, and indicating the presence of the data storage cartridge at the end of travel in the receiver.

In another embodiment, a portable magnetic disk drive cartridge is provided which may be subject to rough handling, as examples, manually, or for use with an automated data storage library which is capable of storing portable data storage media cartridges in storage shelves and having at least one robot accessor for gripping and transporting the portable data storage cartridges. The portable magnetic disk drive cartridge comprises a cartridge shell, which may have an exterior dimensional form factor for storage in the storage shelves and gripping by the robot accessor. An encased, self-contained, magnetic disk drive assembly is mounted in the cartridge shell by a shock mount supporting and mounting the encased magnetic disk drive assembly within the cartridge shell. A flex cable interconnects the encased magnetic disk drive assembly with an external data transfer interface of the cartridge, the external data transfer interface providing data transfer with respect to a transfer station, for example, of an automated data storage library. The flex cable extends from the external data transfer interface to the rear end of the disk drive assembly, which is the end of the disk drive assembly opposite the external data transfer interface, providing flexibility for mechanically isolating the disk drive assembly from the cartridge shell.

An automated data storage library in accordance with another embodiment of the present invention, comprises a plurality of storage shelves for storing portable data storage cartridges, some of the portable data storage cartridges comprising data storage media cartridges containing data storage media, and some of the cartridges comprising magnetic disk drive cartridges containing magnetic disk drives. The library further comprises at least one data storage drive for reading and/or writing data on the data storage media of the data storage media cartridges; at least one transfer station for providing data transfer with respect to the magnetic disk drive cartridges; and at least one robot accessor for gripping and transporting the portable data storage cartridges amongst the storage shelves, the data storage drive, and transfer station.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
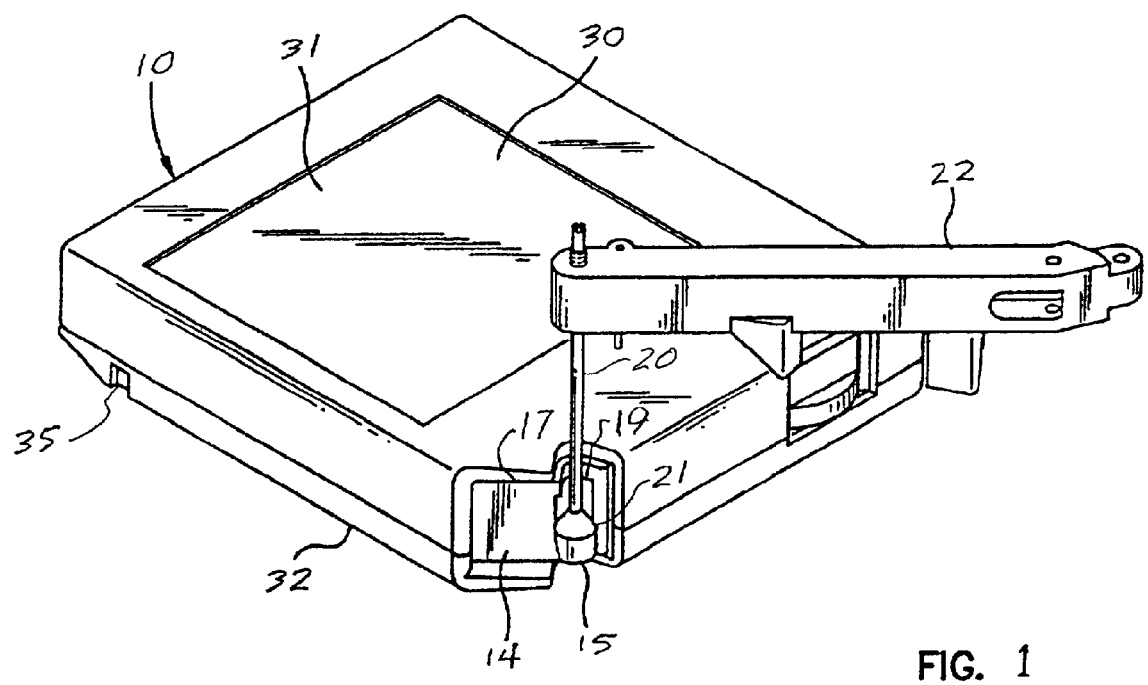
FIG. 1 is an isometric view of a prior art magnetic tape cartridge and leader block interlocked with a prior art leader block threading pin.
Figure 2:
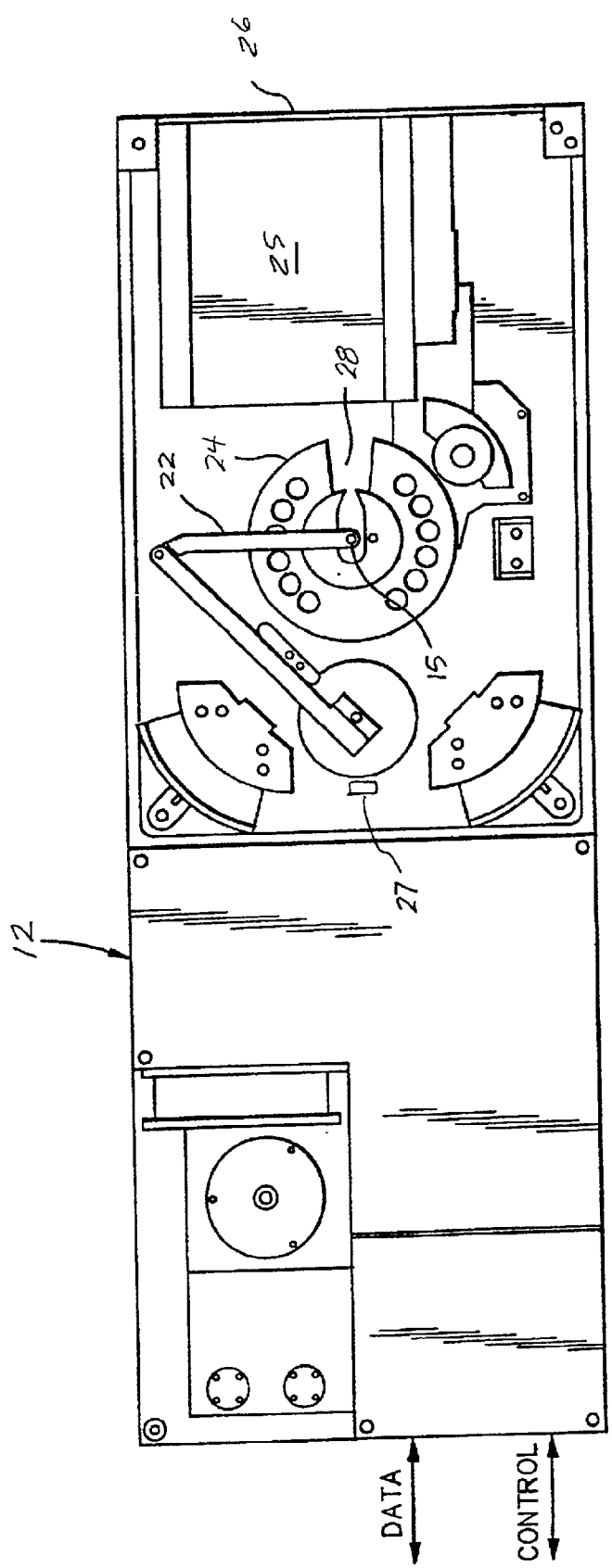
FIG. 2 is a diagrammatic illustration of a prior art magnetic tape drive employing a prior art leader block threading pin.

Referring to FIGS. 1 and 2, prior art data storage cartridges 10 typically comprise a data storage media, such as magnetic tape, which are inserted into a separate prior art data storage drive 12 so that the data may be read and/or written on the data storage media.

The cartridge 10 must be have an opening or be openable so that the media can be inserted into the data storage drive. In the case of a single reel magnetic tape cartridge, the tape has a leader block 14 which is engaged by a threading pin 15, and then threaded into the data storage drive 12. The leader block 14 recesses and nests in an opening 17 of the cartridge, which, in the case of a 3480/3490 type magnetic tape cartridge, is in one corner of the cartridge. The leader block is connected to a leader of the magnetic tape which is stored on a reel within the cartridge. The leader block has a hole 19 therethrough into which the threading pin 15 is inserted. A shaft 20 of the threading pin is inserted into the hole and either the cartridge is lowered or the threading pin is raised so that a shaped cavity of the leader block 14 interlocks with an enlarged portion 21 of the threading pin.

The threading pin 15 is connected to an arm 22 which is operated by the data storage drive 12 for pulling the leader block out of the cartridge and threading the magnetic tape onto a reel 24. The tape cartridge 10 is loaded into a cartridge receptacle 25 through a slot 26, and the threading pin 15 engages the leader block 14. The arm 22 then transports the leader block with the magnetic tape leader from the receptacle 25 through various bearings and a read/write head 27 to a radial slot 28 in the reel 24 and to a central location in the reel. The reel 24 then turns to wind the tape past the read/write head 27 to read and/or write on the magnetic tape.

As shown in FIG. 1, the magnetic tape cartridge 10 comprises a generally rectangular cartridge shell 30 forming an exterior dimensional form factor, and which may have a top half 31 and a bottom half 32. A notch 35 is provided to interlock with a holder in a storage shelf of an automated data storage library which tends to hold the tape cartridge in position in the shelf.

Figure 3:
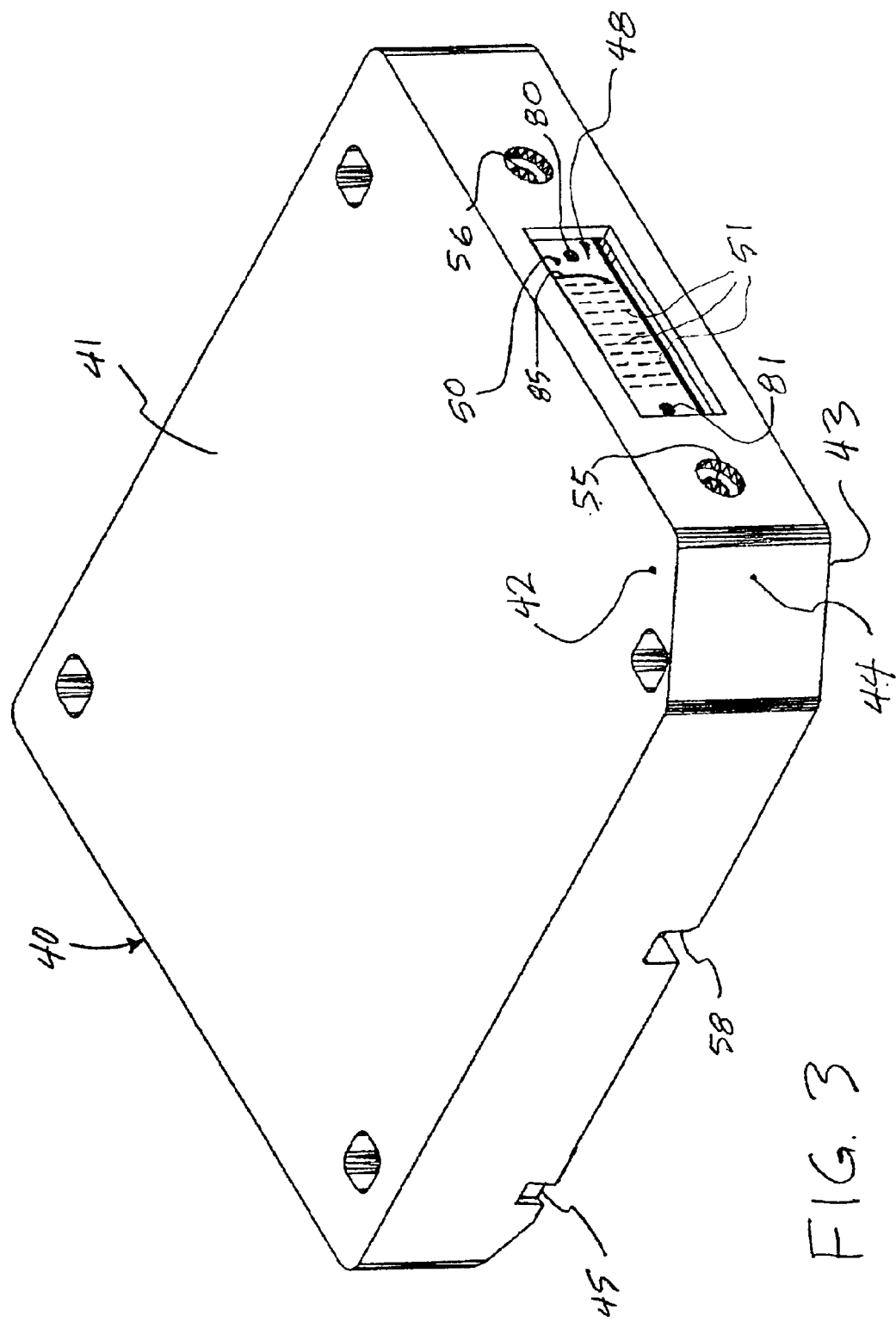
FIG. 3 is an isometric view of a portable data storage cartridge containing a data storage device in accordance with the present invention.

Referring to FIG. 3, a data storage cartridge 40 is provided having a cartridge shell 41 comprising a substantially identical exterior dimensional form factor as the tape cartridge 10 of FIG. 1 with the leader block 14. The data storage cartridge comprises a blocking portion 42 on at least one side of the location 17 of the tape cartridge leader block hole 19, to differentiate identification of the data storage cartridge 40 from the tape cartridge 10. In one aspect, the blocking portion 42 is opaque to optically block an optical source from a corresponding sensor, whereas the prior art leader block hole will transmit an optical beam, thereby differentiating the data storage cartridge 40 from a tape cartridge. Alternatively, or additionally, an opaque blocking portion 43 may be located on the opposite side of the data storage cartridge 40. In another aspect, a blocking portion 44 is located at a side of the location of the leader block hole at which the threading pin of FIG. 1 begins engagement of a tape cartridge by a tape drive of FIG. 2, and thereby prevents engagement of the data storage cartridge and provides the differentiated identification of the portable data storage cartridge.

A notch 45, similar to the notch 35 of tape cartridge 10 of FIG. 1, is provided to interlock with a holder in a storage shelf of an automated data storage library which tends to hold the data storage cartridge in position in the shelf.

As will be discussed, the cartridge shell 41 mounts a data handling agent, such as a data storage device, therein. Also as will be discussed, an external data transfer interface electrical connector 48 is provided, incorporating a substrate 50, having electrical contacts 51 on a facing surface of the substrate. The electrical contacts 51 are coupled to the data handling agent, and are arranged to match electrical contacts of a transfer station, when in a face-to-face relationship.

Alignment, or registration, holes 55 and 56 are provided and mate with corresponding alignment pins of the transfer station to laterally align and register the data transfer interface of the portable cartridge 40 with a data transfer interface of the transfer station.

Figure 4:
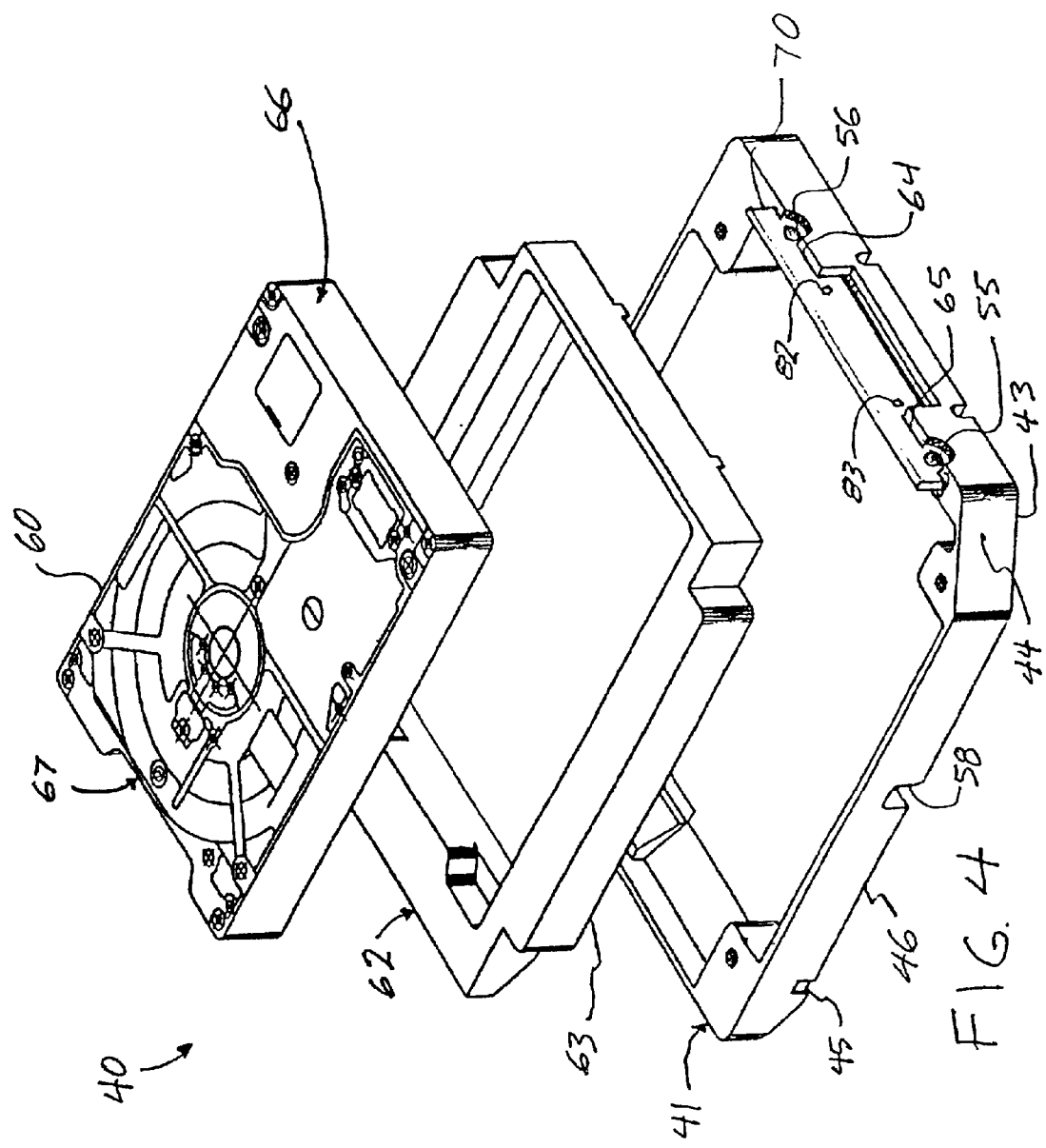
FIG. 4 is an exploded view of an example of a portable data storage cartridge of FIG. 3 containing an encased magnetic data storage drive.
Figure 5:
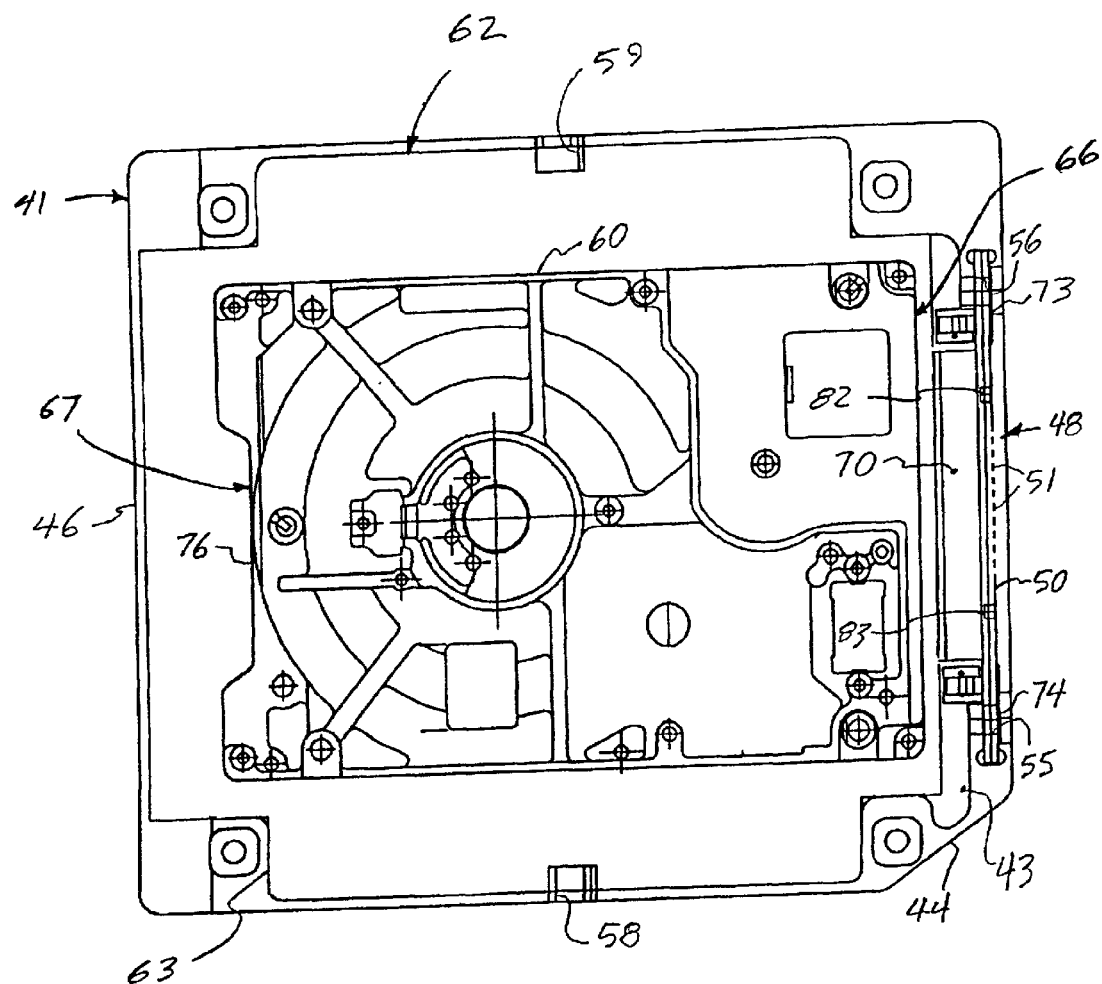
FIG. 5 is a plan view of the portable data storage cartridge of FIG. 4.

An exploded view of an example of a portable data storage cartridge 40 of FIG. 3 is illustrated in FIG. 4, and a plan view is illustrated in FIG. 5, and contains an encased, self-contained and operational, magnetic data storage drive 60. An example of an encased, self-contained, magnetic data storage drive of the desired form factor to fit within the cartridge shell 41 comprises the IBM Travelstar 2.5 inch series of magnetic data storage drives. Specifically, FIGS. 4 and 5 illustrate the bottom half 46 of the cartridge shell 41.

Referring to FIGS. 3–5, in one aspect, notches 58 and 59 are provided to allow a loader of the transfer station to engage the portable data storage cartridge 40 and to force the electrical contacts 51 of the data transfer interface electrical connector 48 into non-wiping contact with matching electrical contacts of the transfer station.

Figure 6:
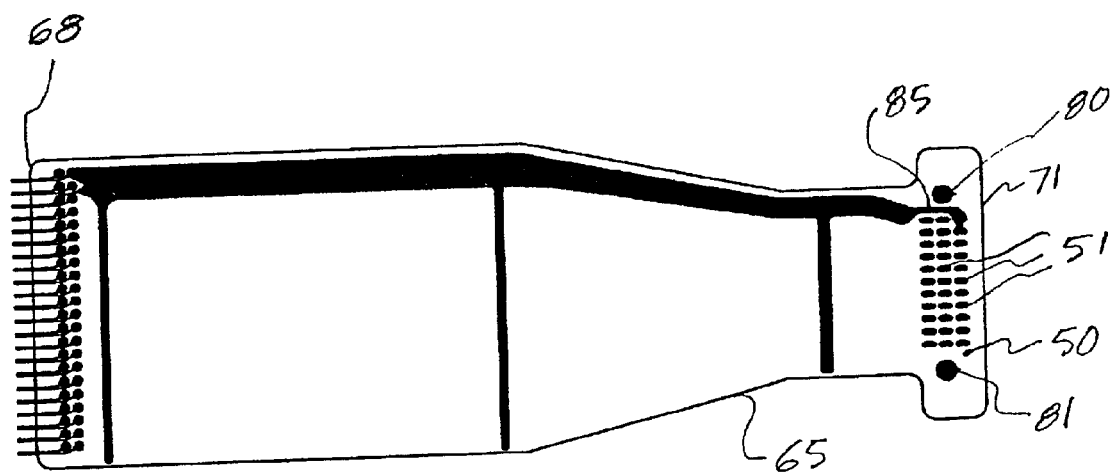
FIG. 6 is a plan view illustration of a flex cable of the portable data storage cartridge of FIG. 4.

In another aspect, a shock mount 62 supports and mounts the data storage device within the cartridge shell 41. Specifically, FIGS. 4 and 5 illustrate the bottom half 63 of the shock mount 62. The shock mount 62 is arranged to insure that the data storage device is fully separated from and isolated from potential mechanical contact with the cartridge shell or the data transfer interface electrical connector 48. Referring additionally to FIG. 6, a flex cable 65 both provides the electrical contacts 51 at a substrate 71 and interconnects the data storage device and the external data transfer interface 48, while also isolating mechanical contact between the data storage device and the cartridge shell 41, thereby further insuring the full separation and mechanical isolation of the data storage device, such as the encased magnetic disk drive assembly 60, from the cartridge shell 41. As the result, the data storage device is protected from rough handling and is able to withstand the dropping of the cartridge, or misplacement the cartridge such that it is handled roughly, either through actions of a robot accessor or through manual handling.

With respect to this aspect of the present invention, the cartridge shell 41, shock mount 62, data transfer interface 48, and flex cable 65 may comprise any configuration suitable for supporting a particular data storage device, while isolating mechanical contact between the data storage device and the cartridge shell. Specifically, the cartridge shell 41 may comprise an exterior dimensional form factor differing from that of a tape cartridge with a leader block. In one embodiment, the data storage device 60, such as an encased magnetic disk drive assembly, is positioned in the cartridge shell 41 such that a facing end 66 faces the data transfer interface 48, and a rear end 67 is opposite the data transfer interface. The flex cable 65 interconnects the external data transfer interface 48 and the data storage device 60 at the rear end 67 of the data storage device. Preferably, the flex cable 65 is of a length to provide sufficient slack to be loose without strain or tension even under full compression of the shock mount 62 in a direction toward the side of the cartridge shell opposite the data transfer interface. Thus, unlike the '360 patent, the flex cable 65 may be of a standard type, without slits, employing the length of the flex cable to provide flexibility in all directions, and thereby provide the mechanical isolation.

The data storage device 60 is preferably encased, self-contained and operational, comprising both the necessary mechanical and electronic components. In the context of an encased magnetic disk drive assembly, the assembly comprises at least one rotatable disk, a motor for rotating the disk(s), at least one head, an actuator and servo system for seeking and tracking, and addressing, motor control and data handling electronics for reading and writing data, and for communicating at the data transfer interface, for example, employing an industry standard format, such as IDE, SCSI or PCI. Thus, the device does not have to be opened to provide data transfer.

Figure 7A:
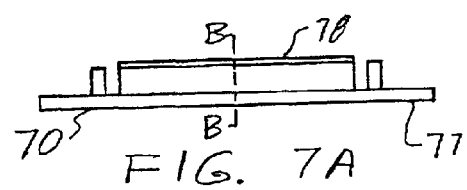
FIGS. 7A and 7B are respective top and cross-section views of a backing plate of the portable data storage cartridge of FIG. 4.
Figure 7B:
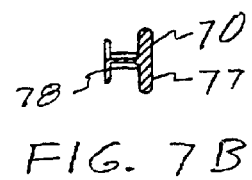
Figure 8:
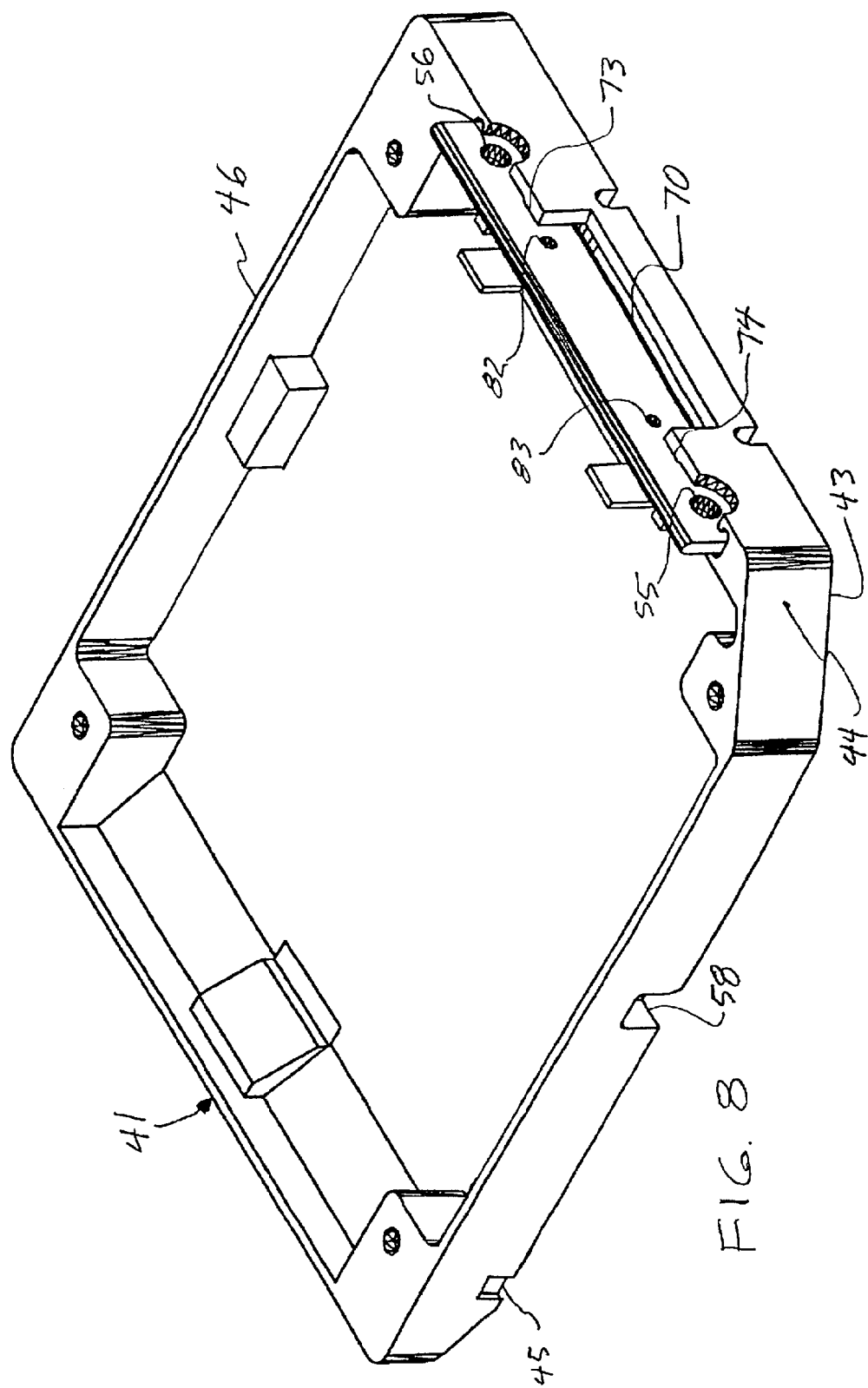
FIG. 8 is an isometric view of the bottom half of the cartridge shell of FIG. 4, with the backing plate of FIGS. 7A and 7B.
Figure 9:
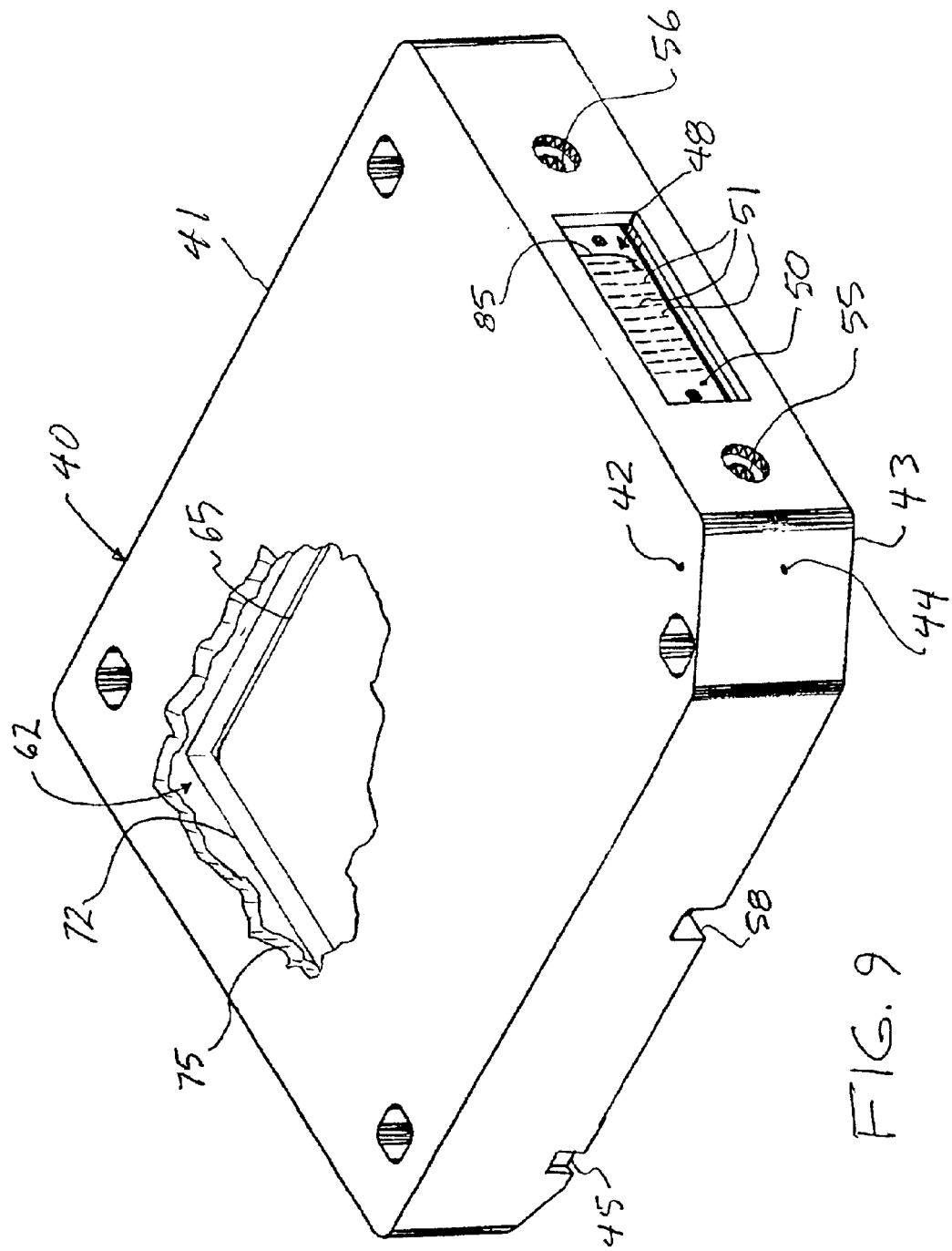
FIG. 9 is a partially cut away isometric view of the portable data storage cartridge of FIG. 4 illustrating the flex cable of FIG. 6.

Referring additionally to FIGS. 7A, 7B, 8 and 9, a substantially flat backing plate 70 is provided which supports and mounts a termination 71 of the flex cable 65 of FIG. 6, forming the electrical connector 48. The backing plate 70 and flex cable termination 71 snap into slots 73 and 74 in the cartridge shell 41 for mechanical support. The backing plate 70 thus supports and positions the facing surface 50 of the flex cable 65 to form the external data transfer interface electrical connector. FIG. 9 also illustrates the top half 72 of the shock mount 62 and the top half 75 of the cartridge shell 41.

The flex cable 65 comprises a plurality of lands coupled to the electrical contacts 51 of the facing surface 50 at the termination 71, and, at termination 68, are coupled to the data storage device, such as encased magnetic data storage drive 60 for example, at a connector 76 at the rear end 67 to provide the above described isolation.

In one embodiment, the electrical contacts 51 of the substantially flat substrate facing surface 50 comprise pads containing gold for providing gold contact surfaces. For example, the contacts comprise copper pads on which are plated a diffusion barrier, such as nickel, and Type II gold pads plated on the diffusion barrier, but which are plated to a thickness greater than standard. As an example, the thickness of the gold pads is substantially 100 micro inches. As defined by those of skill in the art, a plating of about 8 micro inches is considered a "flash", about 15 micro inches is considered "adequate", and about 30 micro inches is considered "standard". The diffusion barrier is preferably plated to a thickness greater than 50 micro inches. Type II gold pads are also referred to as "hard gold" by those of skill in the art, and comprises a defined set of alloys. Preferably, the gold pads are electrolytically plated.

In an alternative embodiment, other materials having characteristics similar to gold may be employed for the electrical contacts 51, such as palladium or palladium-nickel. Pads containing palladium forming the electrical contacts may have a gold "flash" layer.

In a preferred embodiment, the electrical contacts 51 are substantially flat, having substantially flat contact surfaces on the pads. Electrical contact physics defines that the actual contact is made via small microstructure high spots on the contact surface, referred to as "aspirates", distributed throughout the contact interface, even though the contact surface is substantially flat.

As an alternative embodiment, the electrical contacts 51 may comprise shaped contacts having shaped surfaces on the pads. In "Hertzian" theory, shaping the surfaces tends to concentrate contact force in a small contact area. The shaping may be achieved by plating or material removal, and may assume various shapes, referred to as, e.g., dimple, crowned, hertzian stress dot, flat on sphere, dendrite, crossed cylinders, sphere on cup, or sculptured.

Further, at least one of the electrical contacts 51 of the substantially flat substrate facing surface comprises an elongated contact, as will be discussed.

As illustrated by the cross section shown in FIG. 7B, the backing plate 70 is in the general form of an "H" beam, with a front portion 77 supporting and positioning the flex cable termination 71, and a rear portion 78 which provides structural strength. As will be discussed, the data storage cartridge 40, when loaded into the transfer station, will be subjected to considerable force in a direction normal to the facing surface 50, for example, over 10 pounds, to effect the non-wiping contact with the transfer station data transfer interface, requiring that the backing plate have considerable structural strength, for example, comprising a hard, durable plastic. Examples of plastics having good structural strength comprise "Ryton", a polyphenylene sulphide resin from Phillips 66; "Ultem", a polyetherimide resin from GE; and "Lexan", a polycarbonate from GE.

In another aspect, the alignment, or registration, holes 55 and 56 are provided in the substantially flat backing plate 70 in close proximity to the substantially flat substrate 50. The substrate 50 of the flex cable termination 71 is aligned with respect to the backing plate 70 at the time of assembly by use of a probe inserted through holes 80 and 81 of the termination 71 and into holes 82 and 83, respectively, of the backing plate 70. Thus, the substantially flat substrate facing surface 50 is aligned with respect to the backing plate 70 and the alignment or registration holes 55 and 56 therein. The alignment holes are arranged for mating with corresponding transfer station alignment pins to register the external data transfer interface electrical connector 48 with respect to the transfer station.

The flex cable 65, in addition to coupling with the data handling agent, or data storage device, to provide data transfer with the contacted transfer station, is coupled to a power input of the data handling agent to provide power from the transfer station to the data handling agent.

In another aspect, when registered and aligned with the transfer station, the backing plate 70 is in contact with the alignment pins at holes 55 and/or 56. The backing plate 70 comprises a semiconductive plastic material having electrical resistivity. In one example, the material has sufficient embedded carbon to provide the electrical resistivity, comprising 10%–30% carbon filled plastic. As an alternative, the backing plate 70 comprises two plates, one plate comprising the "H" beam, and the other plate, preferably in front of the "H" beam, and with the alignment holes, comprising a carbon filled semiconductive member. The backing plate is electrically coupled to the data storage device by means of land 85 of flex cable 65, to a ground thereof, thereby forming an electrostatic discharge path from the data storage device to the backing plate and through the electrically semiconductive material to the alignment pins of the transfer station, which are electrically grounded, as will be discussed. Any of the above discussed plastics may be carbon filled and employed as the backing plate 70 or as the carbon filled one of two plates. A specific example of a carbon filled plastic comprises a 20% carbon filled polycarbonate, called "Stat-Kon DC-1004-FR".

Figure 10:
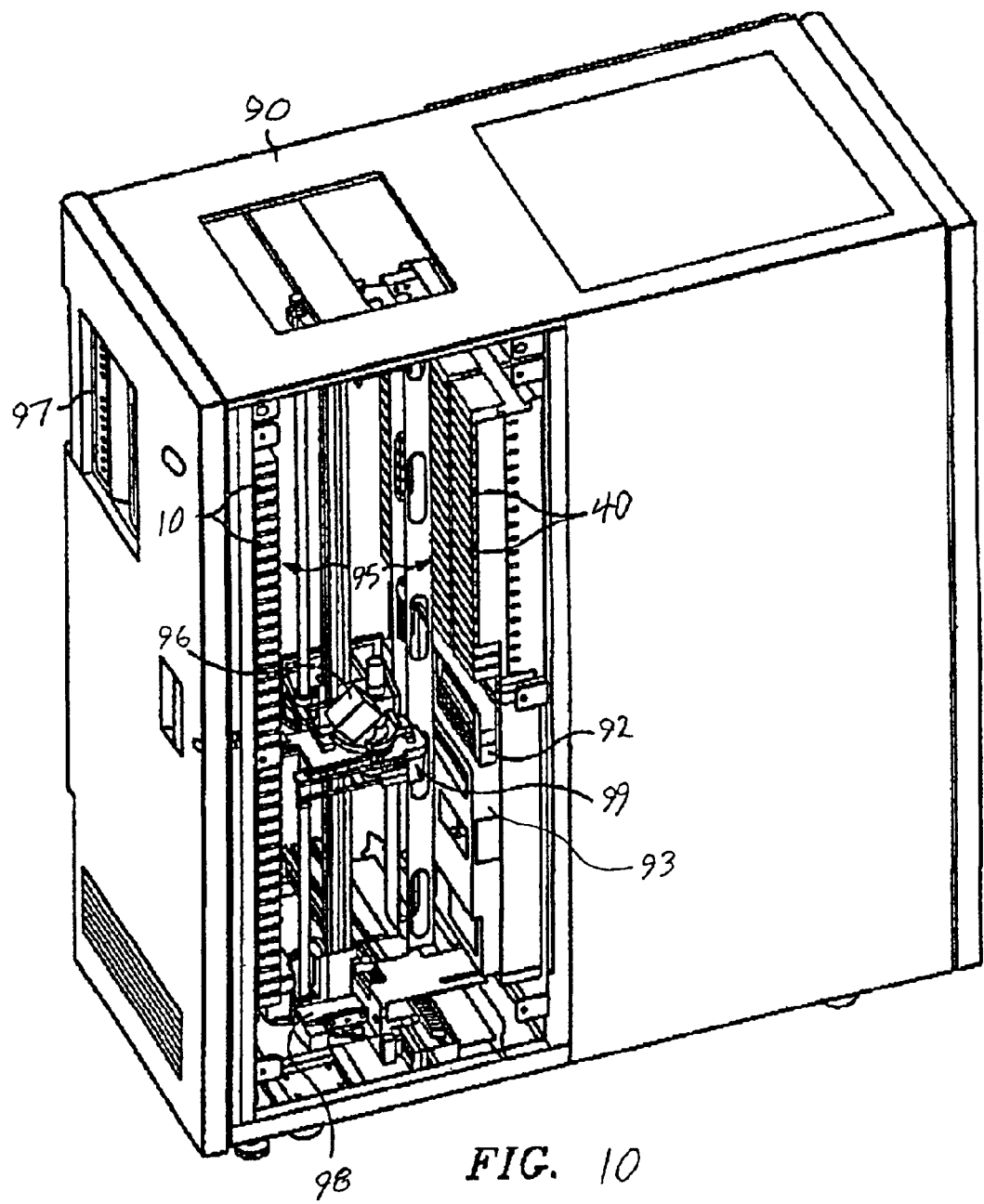
FIG. 10 is an isometric view of an automated data storage library for storing, transporting, and providing data transfer with respect to tape cartridges of FIG. 1 and portable data storage cartridges of FIG. 3.
Figure 11:
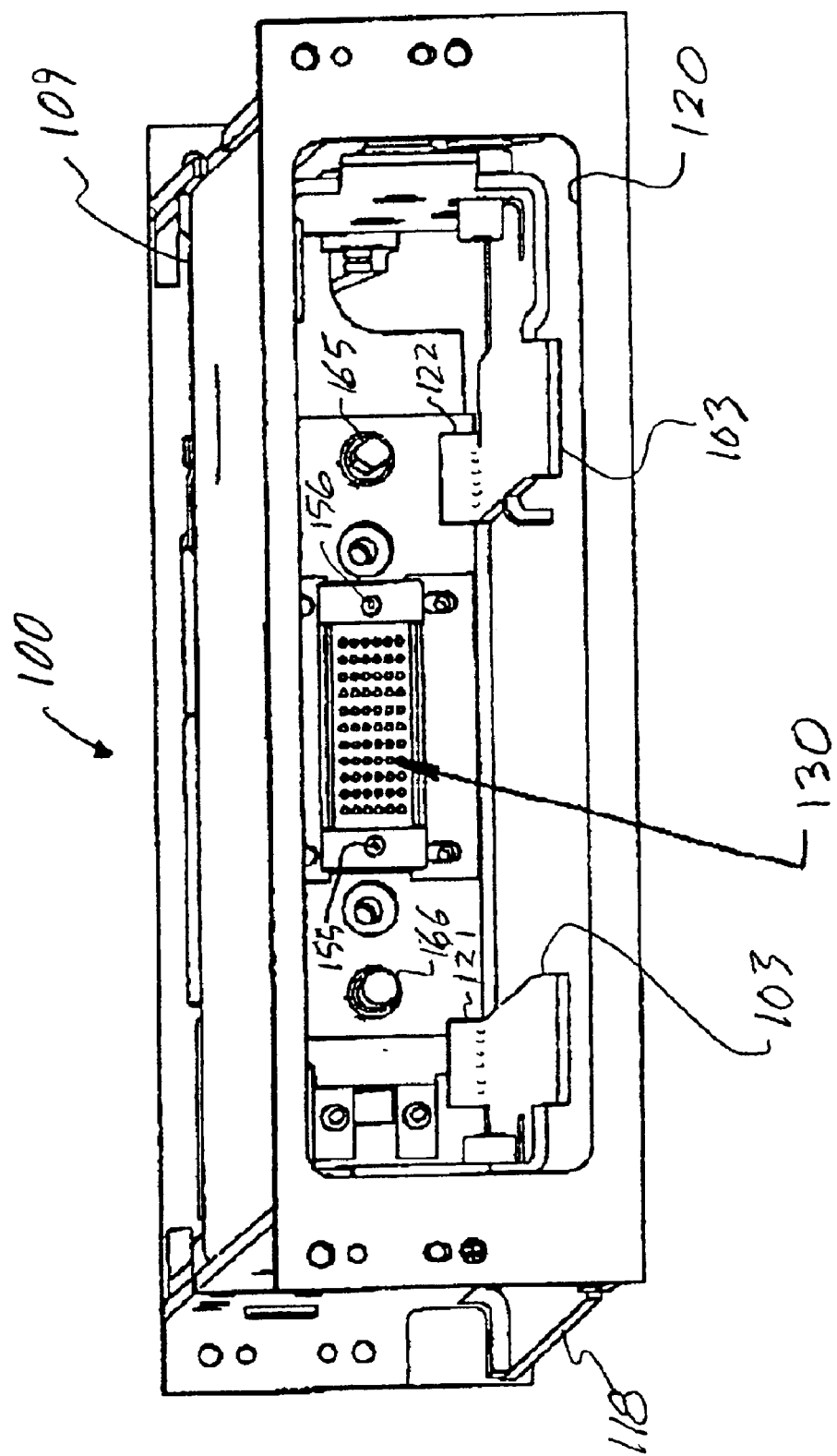
FIG. 11 is an isometric view of a transfer station for providing data transfer with respect to the portable data storage cartridge of FIG. 3 and for differentiating the portable data storage cartridge of FIG. 3 from a tape cartridge of FIG. 1.

FIG. 10 illustrates an automated data storage library 90 for storing, transporting, and providing data transfer with respect to tape cartridges 10 of FIG. 1 and portable data storage cartridges 40 of FIG. 3. The library 90 comprises at least one, and preferably a plurality of, data storage drives 92 for reading and/or writing data on data storage media, such as the tape cartridges 10. Additionally, the library comprises at least one, and preferably a plurality of, transfer stations 93 for providing data transfer with respect to the data storage cartridges 40. Both the tape cartridges 10 and the data storage cartridges 40 are stored in storage shelves 95. The various cartridges may be stored in a segregated manner or may be stored randomly throughout the storage shelves. A typical automated data storage library also comprises one or more input/output stations 97 at which a cartridge may be received or delivered. A robot accessor 98, including a gripper 99, grips and transports a selected cartridge 10 or 40 amongst a storage shelf 95, an input/output station 97, a transfer station 93 and/or a data storage drive 92. The automated data storage library robot accessor may also include a media sensor 96. The media sensor 96 may comprise a label reader, such as a bar code scanner, or a reading system, such as a smart card or RF (radio frequency) reader, or other similar type of system, which is able to identify the cartridge, such as by means of its volume serial number, or VOLSER. As one example, the VOLSER may comprise a label placed on the cartridge which is read by a bar code reader. As another example, the VOLSER may be in recorded in an RF chip in the cartridge which is read by an RF receiver.

FIGS. 11–22 illustrate an embodiment of a transfer station 100 and various components. The transfer station may be employed on a stand-alone basis, or may comprise a transfer station 93 of the automated data storage library 90 of FIG. 10.

In one aspect, referring to FIGS. 11–14, the transfer station 100 is arranged to provide data transfer with respect to portable data storage cartridges 40 of FIG. 3, where the portable data storage cartridge has generally an exterior dimensional form factor of a tape cartridge 10 of FIG. 1 having a leader block. As discussed above, the leader block comprises a hole 19 therethrough for engagement by a threading pin. Also as discussed above, the portable data storage cartridge 40 comprises a blocking portion, such as the blocking portion 42, of the cartridge shell 41, which is opaque.

The transfer station 100 comprises a receiver 103 for receiving the portable data storage cartridge. The cartridge may be received manually, or may be received from the robot accessor of the automated data storage library 90 of FIG. 10, or may be received from an automated cartridge loader (ACL) as is known to those of skill in the art.

Optical sources 105 and 106 are mounted at openings 107 and 108 of a top plate 109 of the transfer station. Sensors 115 and 116 are mounted on a printed circuit board (PCB) 118 for sensing the optical sources 105 and 106, respectively. The optical sources 105 and 106 preferably comprise an infrared source, such as an LED optical source, which is focused, providing a focused beam directed toward the respective sensor 115 and 116, which preferably comprise infrared optical sensors.

Optical source 105 and corresponding sensor 115 are located near a receiving slot 120 of the transfer station into which the cartridge is inserted. Thus, as the cartridge, whether it is a tape cartridge 10 or a portable data storage cartridge 40, the cartridge interrupts the beam, such that the sensor 115 detects that a cartridge is being inserted into the receiver 103. Stops 121 and 122 are provided at the end of travel of receiver 103, and comprise the point at which the cartridge is fully received into the transfer station.

Optical source 106 is located at, and directed toward the location of the leader block hole 19 of a tape cartridge 10 and the location of the blocking portion 42 of a portable data storage cartridge 40 when a cartridge is at the end of travel in the receiver. The corresponding sensor 116 is positioned at the location of the leader block hole and blocking portion at the opposite side of the cartridge from the optical source 116. The sensor 116 may be enabled by the sensor 115, and senses the blockage of the optical source 106 by a cartridge shell blocking portion, thereby identifying the differentiated identification of the data storage cartridge, and indicating the presence of the portable data storage cartridge 40 at the end of travel in the receiver 103. Sensor 116 will therefore enable the transfer station to load the portable data storage cartridge 40. If the beam is not blocked, such that sensor 116 continues to detect the beam from the optical source 106, either the cartridge has not been fully inserted into the receiver 103, or the cartridge is a tape cartridge 10, and the beam is received through the leader block hole 19. In this situation, there is an error, and the transfer station will not proceed.

As is understood by those of skill in the art, one or both source 105, 106 and corresponding sensor 115, 116 may be reversed, the source located on the PCB 118, and the sensor on the top plate 109. Also as is understood by those of skill in the art, alternative locations intermediate the PCB and on the top plate may also be employed for mounting the sources and sensors.

Referring to FIGS. 11 and 15–17, in another aspect, a data transfer interface electrical connector 130 of the transfer station 100 is illustrated for mating with the external data transfer interface electrical connector 48 of the portable data storage cartridge 40, of FIGS. 3–9. The transfer station 100 releasably, repeatably provides an electrical coupling with respect to the cartridge external data transfer interface, which comprises a substrate 71 having a plurality of substantially flat electrical contacts 51 on a substantially flat facing surface 50 thereof, the substrate mounted in a portable cartridge 40 capable of being engaged by a loader.

The electrical connector 130 comprises an elastomeric compression element 132 having a plurality of protruding compression members 133 supported by a reference plate 134. Preferably, the compression element is fixed to the reference late 134. As examples, the compression element may be cemented, bonded, or vulcanized to the reference plate. The compression element is positioned at a rear surface 135 of a matching circuitized flexible substrate 136, which preferably comprises a termination of a flex cable 138. The matching circuitized flexible substrate 136 has electrical contacts 141 on a facing surface 140 thereof, the electrical contacts 141 arranged to match the portable cartridge electrical contacts 51 when in a face-to-face relationship. The protruding compression members 133 of the compression element 132 are facing and in contact with the rear surface 135, such that the individual compression members 133 are registered with the corresponding individual electrical contacts 141.

The compression element 132 is generally of the type described in U.S. Pat. Nos. 4,902,234; 5,059,129; 5,873,740; or 5,947,750.

At least ones of the electrical contacts 141 of the matching circuitized flexible substrate 136 of flex cable 138, and corresponding ones of the electrical contacts 51 of the substantially flat substrate facing surface 50 of the flex cable 65 of FIG. 6, comprise elongated contacts, the contacts 141 each registering with two adjacent individual compression members 133 of the elastomeric compression element 132. In this manner, the elongated contacts comprise redundant contacts over two compression members, and have matching contact surfaces which are at least twice as great in surface area as a single contact of the size of a single compression member.

Thus, in the electrical connector 130, the circuitized flexible substrate 136 is positioned on the elastomeric compression element 132 such that a rear surface of the substrate is in contact with the compression members 133, and the elongated contacts 141 on the facing surface 140 of the substrate are registered with two adjacent individual compression members 133. Further, in the electrical connector 48, when the substrate 71 is registered in face-to-face relation with the facing surface 140 of the mating electrical connector 130, the elongated contacts 51 are each positioned to overlie two adjacent individual compression members 133, and with the elongated electrical contacts 51 in releasable contact with corresponding elongated contacts 141.

As with respect to the electrical contacts 51 of flex cable 65 of FIG. 6, the electrical contacts 141 of the substantially flat substrate facing surface 140 may comprise pads containing gold, and preferably comprise copper pads on which are plated a diffusion barrier, such as nickel, and Type II, or "hard", gold pads plated on the diffusion barrier, but which are plated to a thickness greater than standard, for example, to a thickness of substantially 100 micro inches. The diffusion barrier is preferably plated to a thickness greater than 50 micro inches. Preferably, the gold pads are electrolytically plated.

The electrical contacts 141 may also alternatively comprise other materials, such as pads containing palladium, such as palladium or palladium-nickel, and may have a gold "flash" layer.

The electrical contacts 141 preferably are substantially flat, having substantially flat contact surfaces on the pads. Alternatively, the electrical contacts 141 may comprise shaped contacts having shaped surfaces on the pads, as discussed above.

Figure 14:
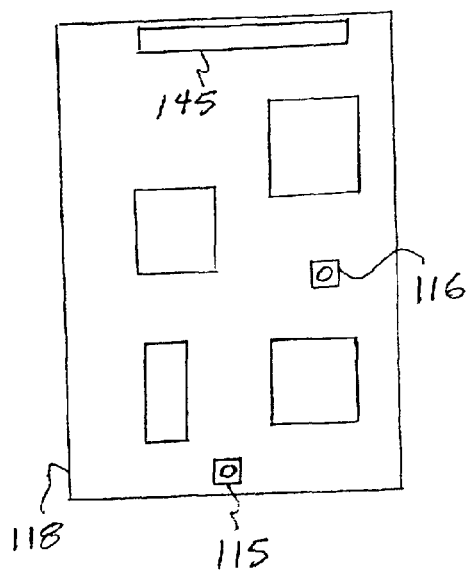
FIG. 14 is a plan view illustration of an example of a PCB mounting sensors for sensing the optical sources of FIGS. 13A and 13B.

The flex cable 138 comprises a plurality of lands coupled to the electrical contacts 141 of the facing surface 140 at the termination 136, and are coupled to the PCB 118 of FIG. 14 at connector 145 at termination 146 of the flex cable.

In another aspect, alignment, or registration, holes 155 and 156 are provided in close proximity to the electrical contacts 141. The flex cable termination 136 is aligned and the electrical contacts 141 registered with respect to the compression members 133 at the time of assembly by use of a probe inserted through holes 157 and 158 of the termination 136 and into holes 155 and 156, respectively, and the flex cable termination is tightened to a predetermined amount at the compression members. As will be discussed, the matching circuitized flexible substrate 136 is tightened only sufficiently to attain registration, while issuing from the elastomeric compression element 132 without an immediate change in direction, and subsequently forming a gradual curve 160, 161 in a direction normal to the facing surface 140. Then, clamps 162 and 163 are bolted into place to hold the circuitized flexible substrate in place. In the illustrated example, clamp 162 holds the flex cable at tail 164, and clamp 163 holds the flex cable 138. As will be discussed, when the external interface of the portable data storage cartridge is registered with the matching circuitized flexible substrate electrical contacts 141, a loader exerts a force on the portable cartridge normal to the facing surface 140, compressing the elastomeric compression element 132 between the matching circuitized flexible substrate 136 and the reference plate 134. The arrangement of the matching circuitized flexible substrate 136 to issue from the elastomeric compression element 132 without an immediate change in direction and subsequently form the gradual curve 160, 161 in a direction normal to the facing surface 140, allows the substrate to move freely in the normal direction without pulling in the lateral direction. This creates a non-wiping contact between the electrical contacts 51 of the portable cartridge substrate 50 of FIG. 3 and the electrical contacts 141 of the matching circuitized flexible substrate 136, thereby forming a releasable, repeatable electrical connection therebetween.

Figure 20:
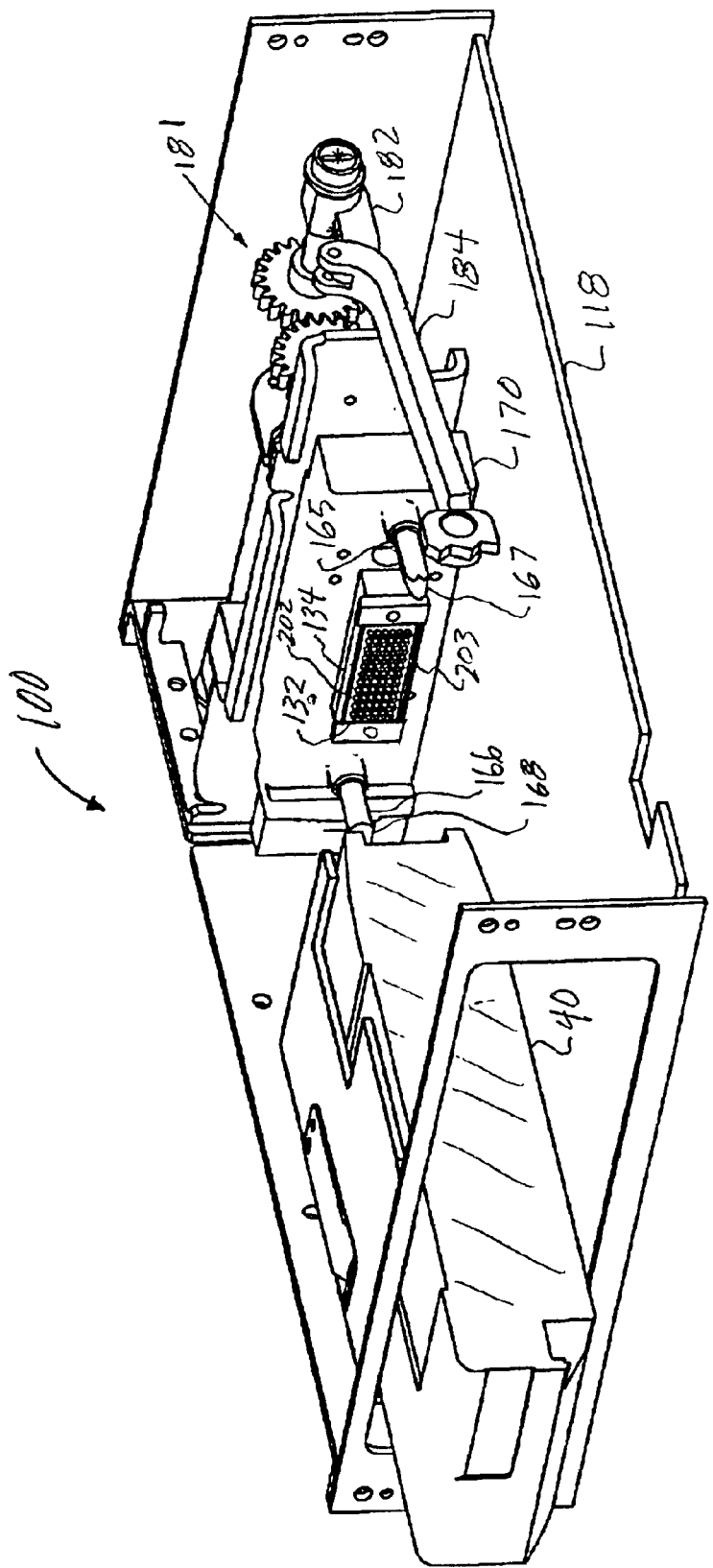
FIG. 20 is a cut away illustration of the transfer station of FIG. 11 and of a portable data storage cartridge of FIG. 3 with the loading mechanism in an unloaded position.

In another aspect, referring additionally to FIG. 20, the transfer station 100 additionally comprises alignment pins 165 and 166 for mating with respective registration holes 55 and 56 of the portable data storage cartridge 40 of FIG. 3 to register the external data transfer interface electrical connector 48 with the station data transfer interface electrical connector 130. Both alignment pins are aligned substantially normal to the facing surface 140 of the matching circuitized flexible substrate 136, and are tapered at the ends 167 and 168, respectively, to a rounded point in the direction of the portable cartridge substrate 50 to orient the portable cartridge substrate and gradually laterally align the portable cartridge substrate and the matching circuitized flexible substrate 136. To prevent tolerance buildup between the alignment pins and the respective registration holes, alignment pin 165 is preferably cylindrical, the same as the corresponding registration hole 55, and of a slightly lesser diameter. As an example, the alignment pin may have a diameter 5% less than that of the registration hole. However, alignment pin 166 is instead a non-round pin, such as a "diamond" pin, as is known to those of skill in the art, and is substantially narrower than pin 165, but of the same height. Thus, the external interface electrical connector 48 of the portable data storage cartridge 40 is properly registered in the vertical direction at both ends by the alignment pins and is properly registered in the horizontal direction by the alignment pin 165.

Figure 17:
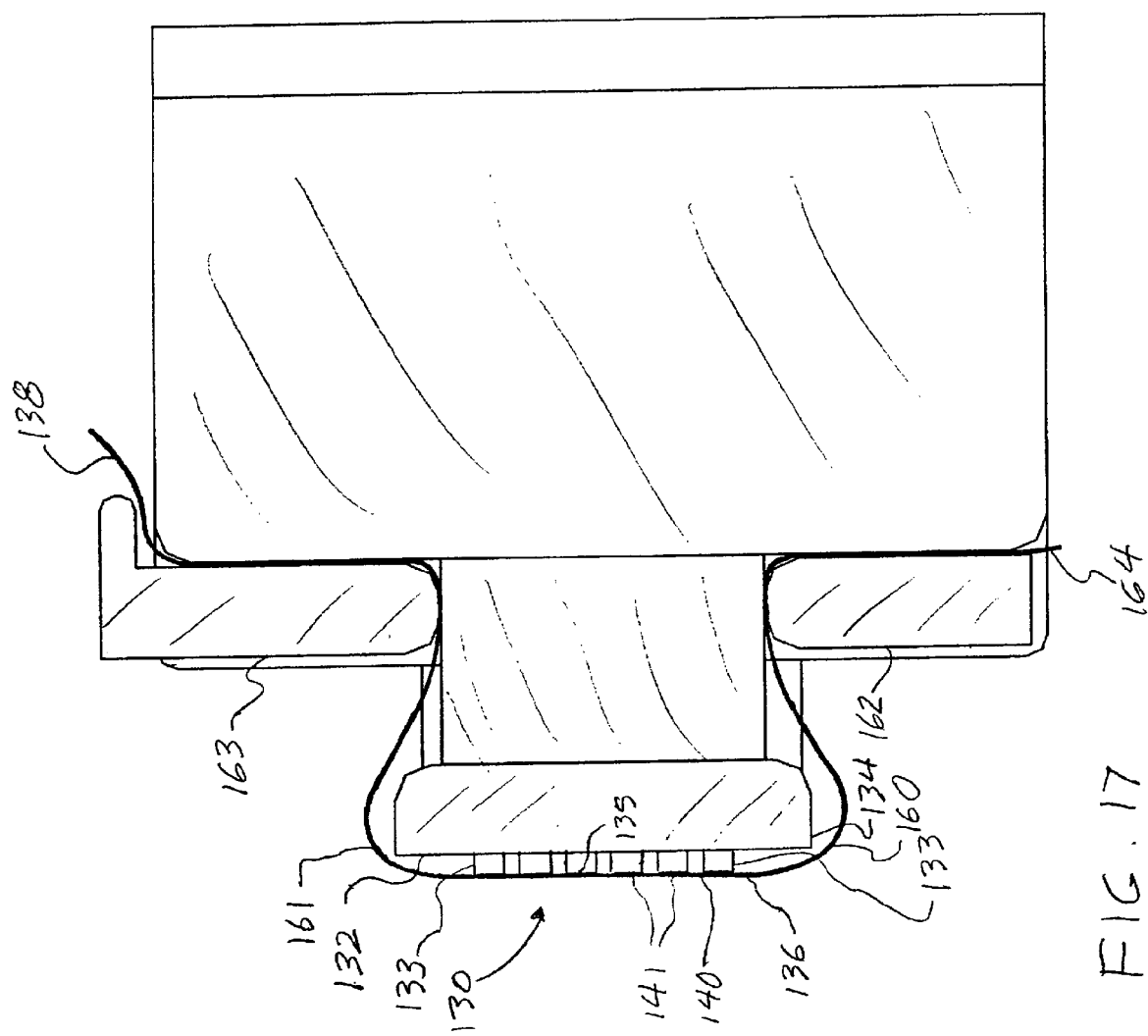
FIG. 17 is a cross section illustration of compression member, reference plate, support member and clamps of FIG. 15, with the flex cable of FIG. 16.
Figure 22:
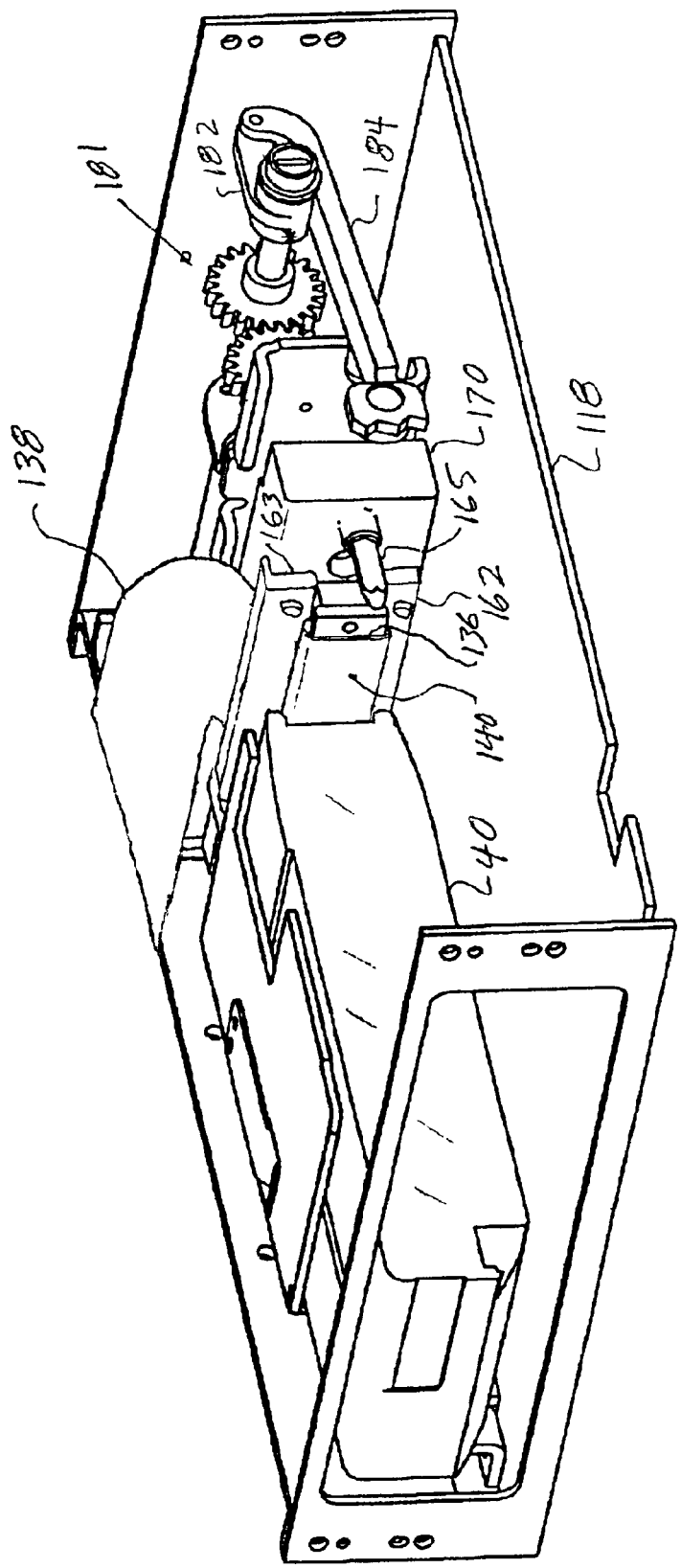
FIG. 22 is a cut away illustration of the transfer station of FIG. 11 and of a portable data storage cartridge of FIG. 3 with the loading mechanism in a loaded position.

In another aspect, referring to FIGS. 17 and 22, the facing surface 140 of the matching circuitized flexible substrate is oriented parallel to gravity, and the cartridge loader is oriented to provide the "normal" force orthogonal to gravity, to minimize debris deposition on the facing surface 140.

Figure 18:
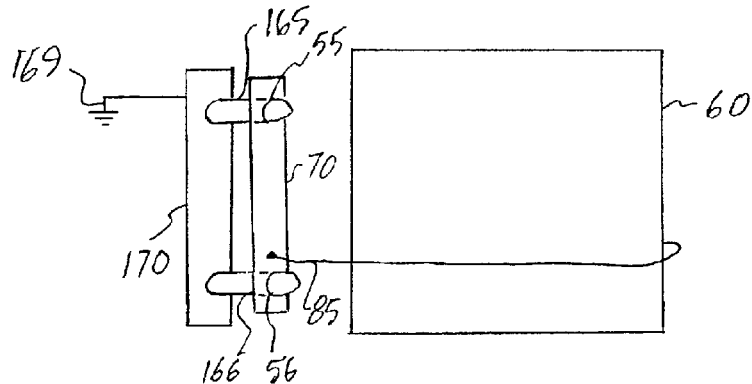
FIG. 18 is a circuit diagram illustrating an electrostatic discharge (ESD) path of the transfer station of FIG. 11 and of a portable data storage cartridge of FIG. 3.

In another aspect, and additionally referring to FIG. 18, when registered and aligned with the transfer station, the backing plate 70 of the portable data storage cartridge 40 of FIGS. 8 and 9 is in contact with the alignment pins 165 and 166 at registration holes 55 and/or 56. As discussed above, the backing plate 70, and therefore the registration holes 55 and 56 are electrically coupled to the data storage device, such as magnetic data storage drive 60, by means of land 85 of the flex cable, to a ground thereof, thereby forming an electrostatic discharge path from the data storage device to the backing plate and through the electrically semiconductive material to the alignment pins. The data storage device, since it is within a portable data storage cartridge, is not externally grounded and, as such, comprises an electrostatic source in the cartridge. The alignment pins 165 and 166 are conductive and coupled to a ground path 169, via support member 170, thereby forming an electrostatic discharge path from the registration holes 55 and 56 of the portable data storage cartridge 40 to the ground path 169.

Figure 12:
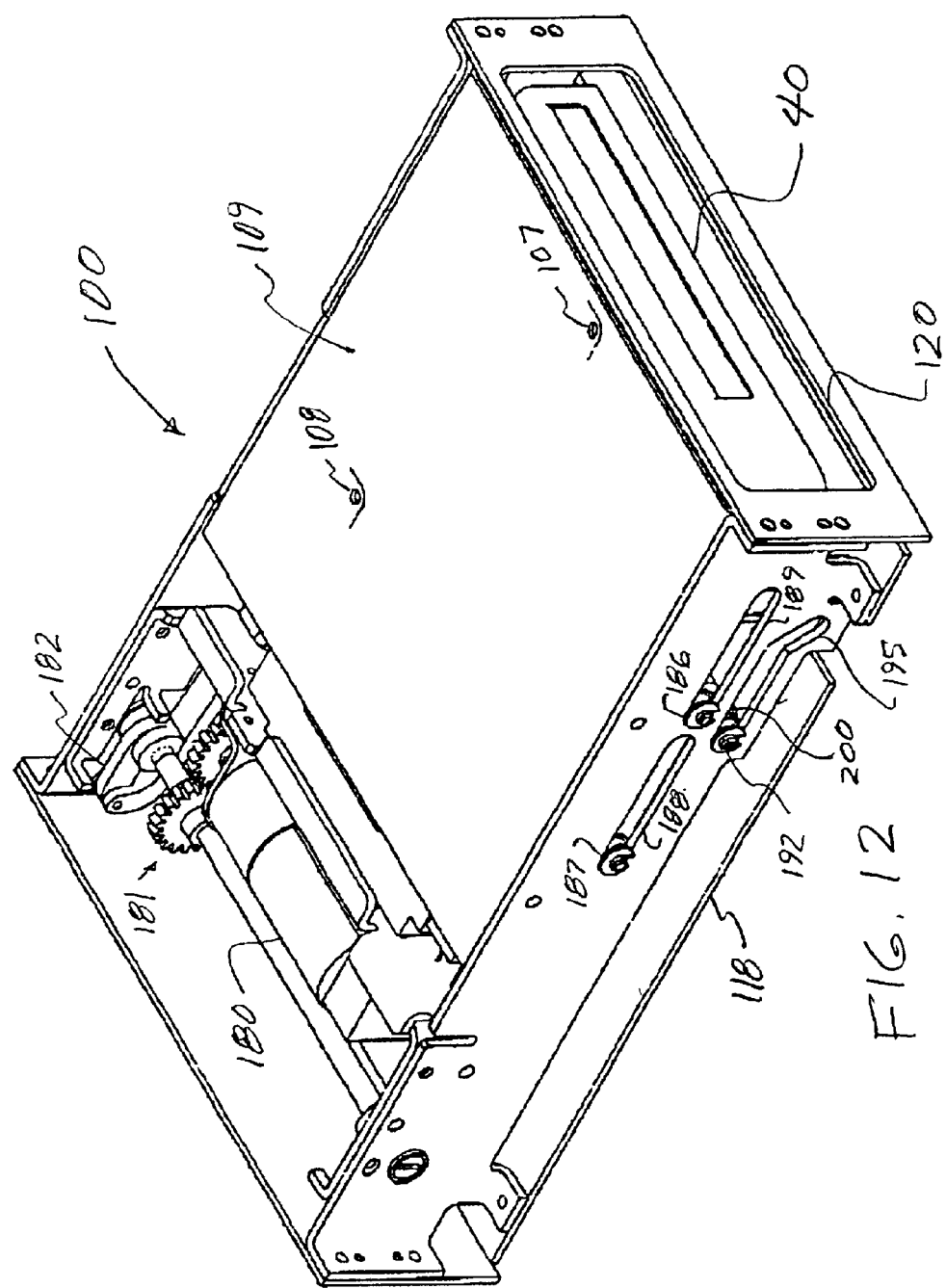
FIG. 12 is an alternative isometric view of the transfer station of FIG. 11, with a loaded portable data storage cartridge of FIG. 3.
Figure 13B:
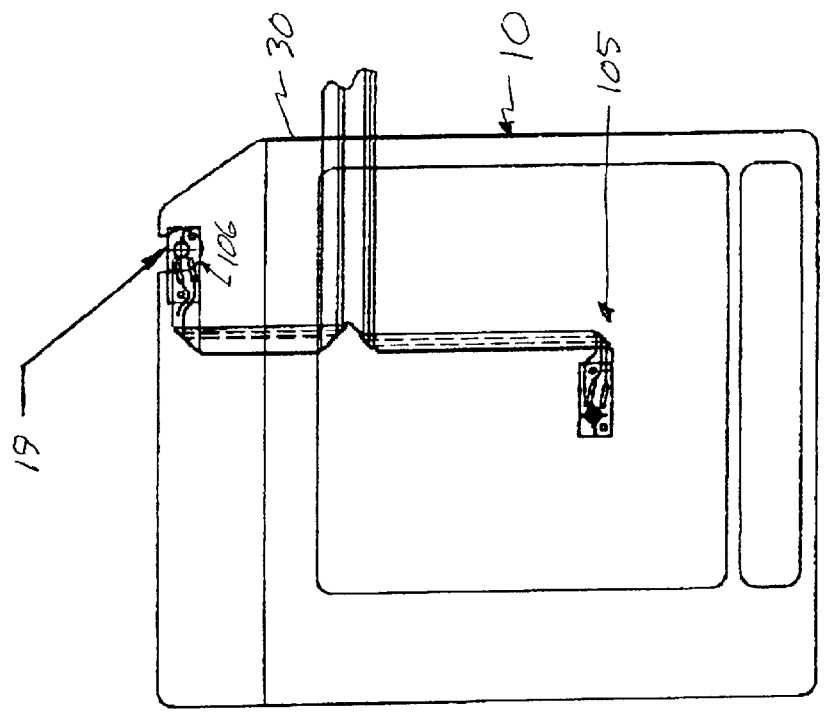
FIGS. 13A and 13B are top view illustrations of an optical source mounted on a top plate of the transfer station of FIG. 12 for detecting, respectively, the portable data storage cartridge of FIG. 3 and the tape cartridge of FIG. 1.
Figure 13A:
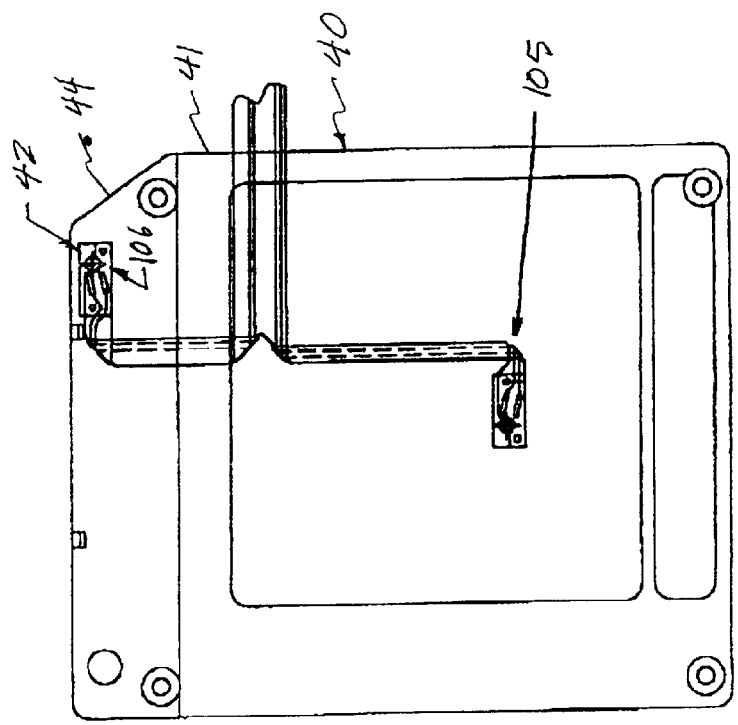
Figure 19:
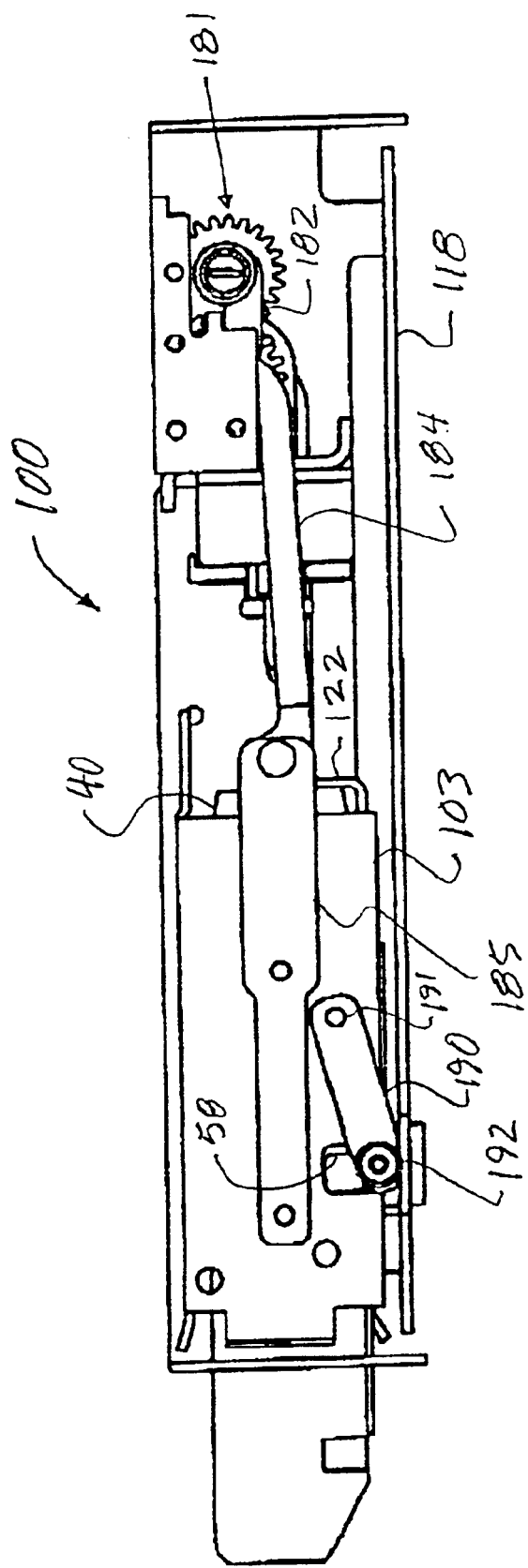
FIG. 19 is a side view cut away illustration of the transfer station of FIG. 11 illustrating the loading mechanism in an unloaded position.
Figure 21:
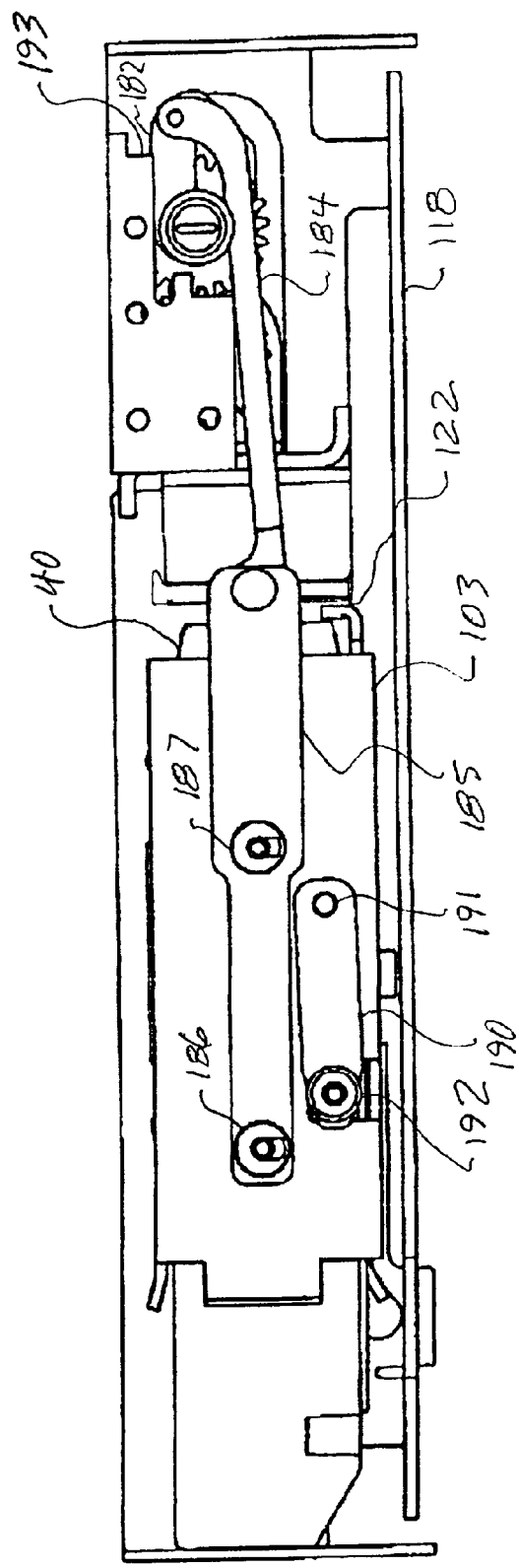
FIG. 21 is a side view cut away illustration of the transfer station of FIG. 11 illustrating the loading mechanism in a loaded position.

Referring to FIGS. 12 and 19–22, a loader of the transfer station 100 is illustrated which loads the portable data storage cartridge, exerting a force normal to the facing surface 140 of the flex cable 138 of FIG. 17. FIGS. 19 and 20 illustrate a cartridge 40 at the end of travel in the receiver 103 at the stops (only stop 122 is shown), and before the cartridge is loaded. FIGS. 12, 21 and 22 illustrate a cartridge that has been loaded. FIG. 22 also illustrates the flex cable 138 as arranged to loop over and outside the mechanism of the transfer station 100 to the PCB 118, thereby both allowing ease of assembly and of replacement of both the PCB and the flex cable.

The loading mechanism is initially at an "insert" position with motor 180 having operated through gear train 181 to rotate bell crank 182 toward the front of the transfer station 100. Bell crank 182 has thus pushed beam 184 toward the front of the transfer station, which pushed arm 185 of receiver 103, and therefore the receiver 103 towards the front opening 120 of the transfer station. Guides 186 and 187 of the arm 185 ride in slots 188 and 189 of the transfer station and movably support the receiver 103 as it moves forward and backwards. An engagement arm 190 is attached to the receiver 103 at pivot 191, and includes a guide 192 which moves in slot 195 of the transfer station. As is understood by those of skill in the art, the guides, arms, beams and slots are the same on each side of the receiver 103. Also as is understood by those of skill in the art, differing arrangements of guides, arms, beams and slots may be employed in accordance with the present invention.

When the receiver 103 is in the "insert" position toward the front opening 120 of the transfer station, slot 195 pulls guide 192 down, away from the receiver 103. An engagement pin 200 is located on the same shaft as guide 192, on the opposite side of arm 190, and protrudes toward the interior of the receiver 103. Thus, as the guide 192 is pulled down by slot 195, the engagement pin 200 is also pulled down, out of the interior of the receiver 103. This allows a portable data storage cartridge to be inserted into the receiver.

The loader is enabled by the sensor 116 of FIG. 14, which, as discussed above, identifies the differentiated identification of the data storage cartridge, indicating the presence of the portable data storage cartridge 40 at the end of travel in the receiver 103.

The sensor 116 enables motor 180 to operate through gear train 181 to rotate bell crank 182 away from the front, and toward the rear, of the transfer station 100. Bell crank 182 thus pulls beam 184 toward the rear of the transfer station, which pulls arm 185 of receiver 103, and therefore the receiver 103, towards the rear of the transfer station. As the receiver 103 is pulled toward the rear of the transfer station, slot 195 elevates guide 192 up, toward the receiver 103, such that engagement pin 200 is elevated into the receiver 103, where it engages the portable cartridge 40 of FIG. 3 at notches 58 and 59. As the receiver continues to be pulled toward the rear of the transfer station, the engagement pins 200 exert a force on the portable cartridge 40 normal to the facing surface 140 of the matching circuitized flexible substrate 136. First, the alignment pins 165 and 166 engage corresponding holes 55 and 56 of the cartridge to orient the portable cartridge substrate and gradually laterally align the portable cartridge substrate and the matching circuitized flexible substrate 136, registering the cartridge substrate electrical contacts 51 in face-to-face relation with the matching circuitized flexible substrate electrical contacts 141. Then the engagement pins exert the normal force on the portable cartridge and cause the portable cartridge substrate 50 (and backing plate 70) to compress the elastomeric compression element 132 between the matching circuitized flexible substrate 136 and reference plate 134 to create non-wiping contact between the electrical contacts 51 of the portable cartridge substrate 50 and the electrical contacts 141 of the matching circuitized flexible substrate 136, thereby forming a releasable, repeatable electrical connection therebetween.

As an example, the force generated by the loader may comprise at least 30 grams per compression member, for a total normal force greater than 10 pounds on the cartridge, and compresses the compression element a depth of about 0.022 inches. In loading the cartridge, the motor 180 rotates bell crank 182 beyond the center of rotation to a stop, at an over-center position, so that the arm tends to be locked in position to prevent inadvertent release of the cartridge. The motor releases the cartridge by rotating back over center and then towards the front opening 120 of the transfer station. Referring to FIGS. 19 and 20, in one embodiment, bell crank 182 is rotated beyond the center of rotation to a stop 193. In an alternative embodiment, bell crank 182 is rotated until beam 184 contacts the pivot end of bell crank 182, such that beam 184 becomes a stop. When against the stop, bell crank 182 is locked under pressure, providing the normal force to compress the compression element 132.

Figure 15:
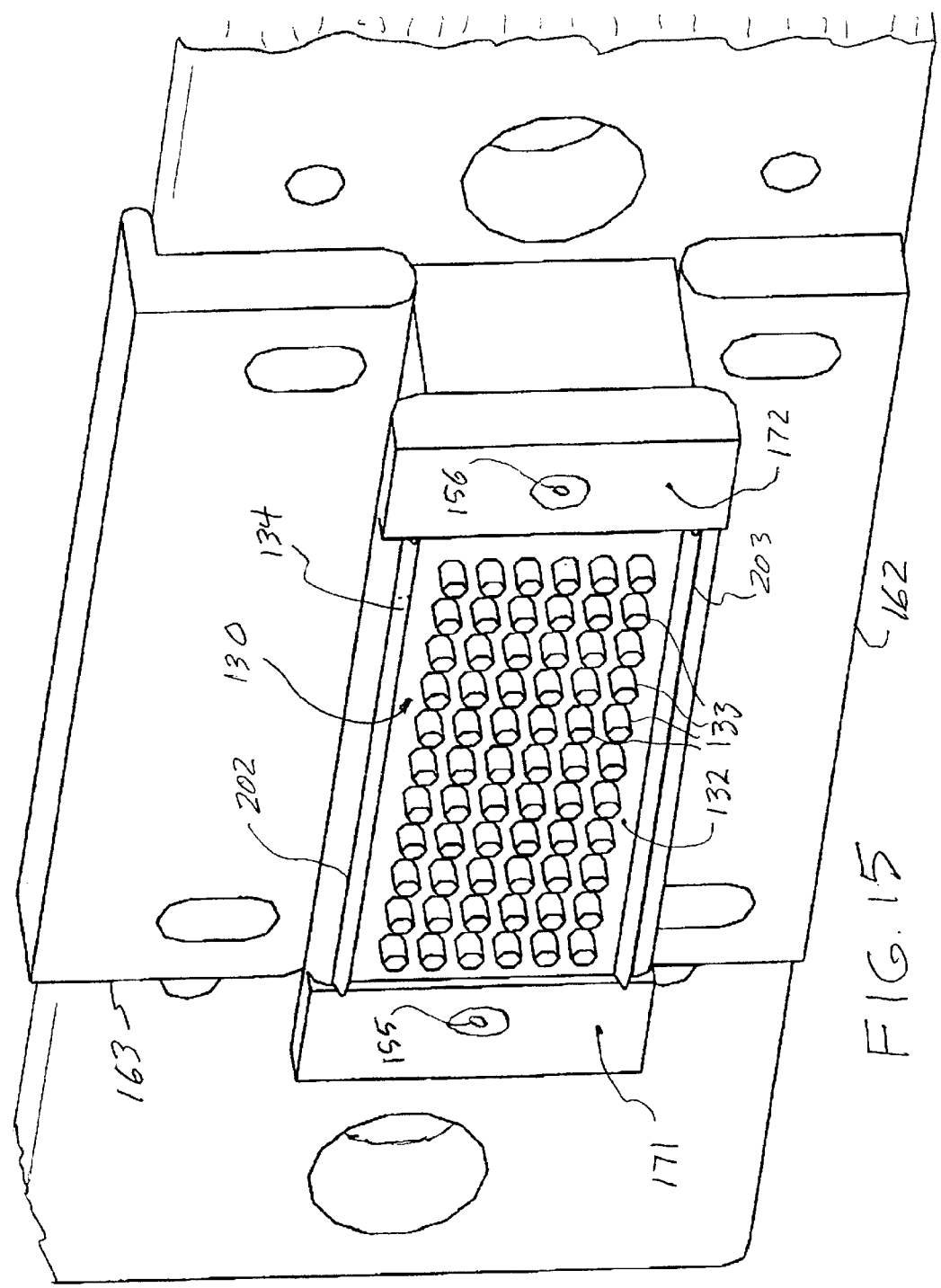
FIG. 15 is an isometric illustration of a compression member, reference plate, support member and clamps of the transfer station of FIG. 11.
Figure 16:
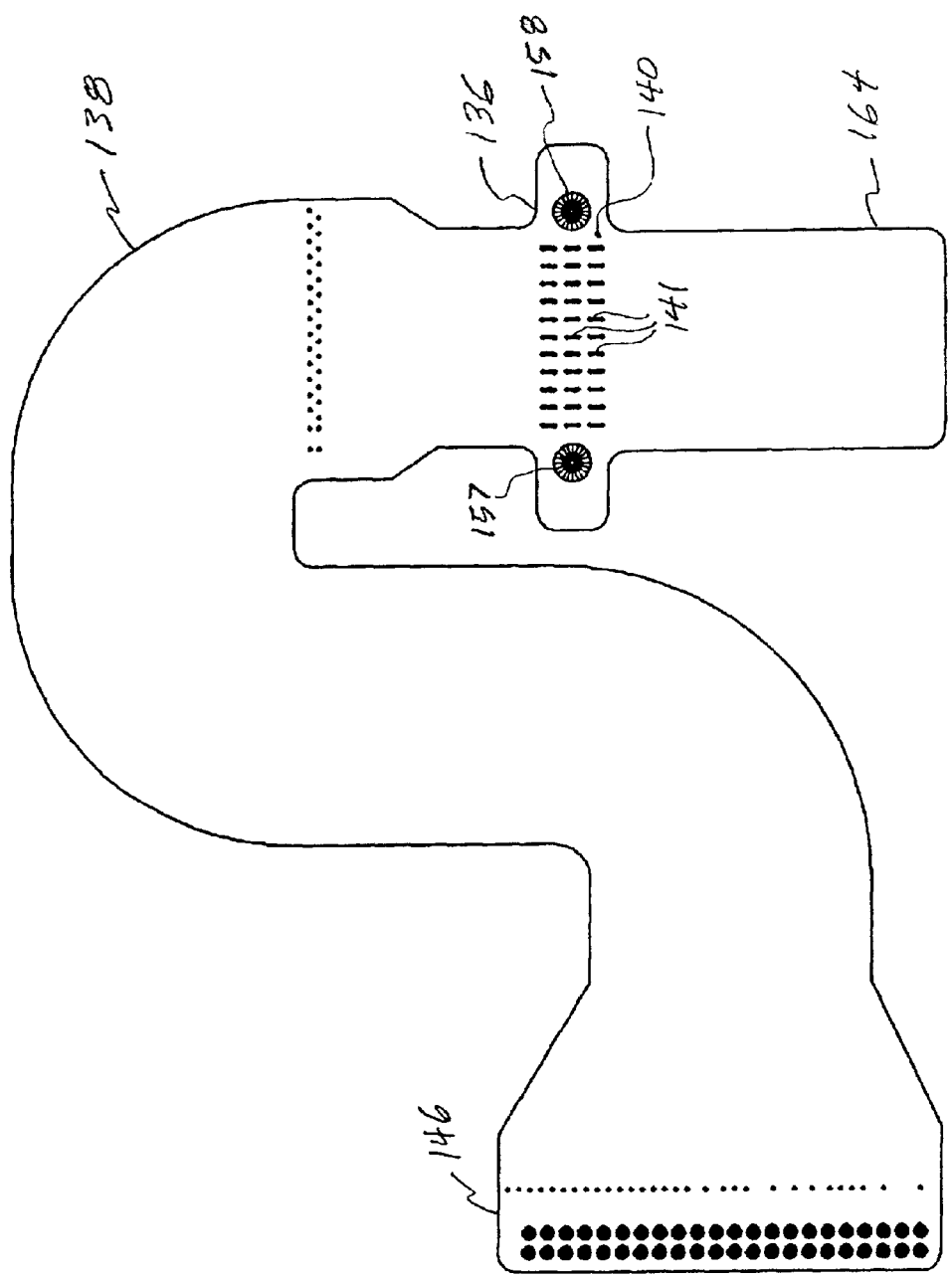
FIG. 16 is a plan view illustration of a flex cable of the transfer station of FIG. 11.

Referring to FIGS. 15 and 20, ribs 202 and 203 are provided at the edges of the compression element 132 to lightly clamp the flex cable substrate 136 of FIG. 16, to help restrain any lateral movement of the flex cable substrate as the individual compression members are compressed under the contacts 141 of the interface.

Surfaces 171 and 172 straddle the flex cable substrate 136 and butt up to the "H" beam 70 of the cartridge of FIG. 8 or the interface 48 of the cartridge of FIG. 3, and limit the compression of the compression members as the motor 180 of FIG. 12 rotates arm 182 to the loaded position.

Figure 23:
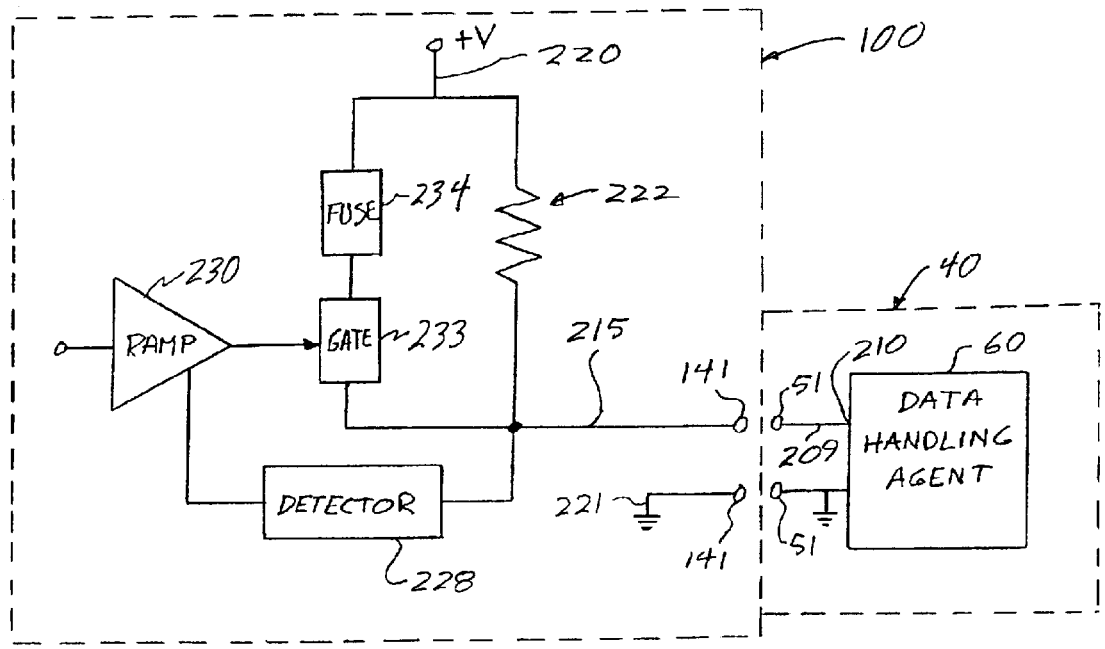
FIG. 23 is a circuit diagram illustrating a power transfer interface of the transfer station of FIG. 11 and of a portable data storage cartridge of FIG. 3.

In another aspect, additionally referring to FIG. 23, the external data transfer interface 48 of the portable data storage cartridge 40, in addition to coupling with the data handling agent, or data storage device, such as magnetic data storage drive 60, to provide data transfer with the contacted transfer station 100, comprises a power transfer interface coupled by one or more lands 209 of the flex cable to a power input 210 of the data handling agent to transfer power from the transfer station 100 to the data handling agent.

In a further aspect, the power transfer interface additionally both verifies electrical contact between the data handling agent and the transfer station before supplying full power, and when applying power, gradually ramps the application of power.

Specifically, a transfer station power supply provides power at input 220 for the cartridge 40. A trickle circuit 222 limits current flow to output 215, and to the data handling agent when electrical contact is first made between contacts 141 of the transfer station 100 and contacts 51 of the cartridge 40. Before contact is made, no current flows, and output 215 is at the same voltage as power input 220, which voltage is detected by a detector 228. As soon as contact is made, a small current flows to the data handling agent, and back to ground 221 limited by the trickle circuit 222, reducing the voltage at output 215, detected by detector 228. Thus, detector 228 detects the current flow to the cartridge 40, thereby verifying electrical contact between the data handling agent and the transfer station.

Once electrical contact is verified, the detector 228 enables ramping circuit 230 to initially operate gate 233 to gate a small amount of power to output 215, and then gradually ramping gate 233 to ramp up to full power. As the power is ramped up, the voltage at output 215 is increased, and may be detected by detector 228. Thus, optionally, detector 228 may be employed to detect any problems during application of full power evidenced by a change in voltage at output 215, and operate ramping circuit 230 to open gate 233. An example of gate 233 is an FET. Detector 128 also detects "unmating", or release of the cartridge 40 when the elctrical contact is unmade, and operates ramping circuit 230 to open gate 233. A fusing circuit 234 may be employed to limit transfer of excessive power to the cartridge 40. The electrical contact verification and the gradual ramping of power insure that the active data handling element or data storage device in the cartridge 40 is protected from electrical spikes which could otherwise damage the device.

Figure 24:
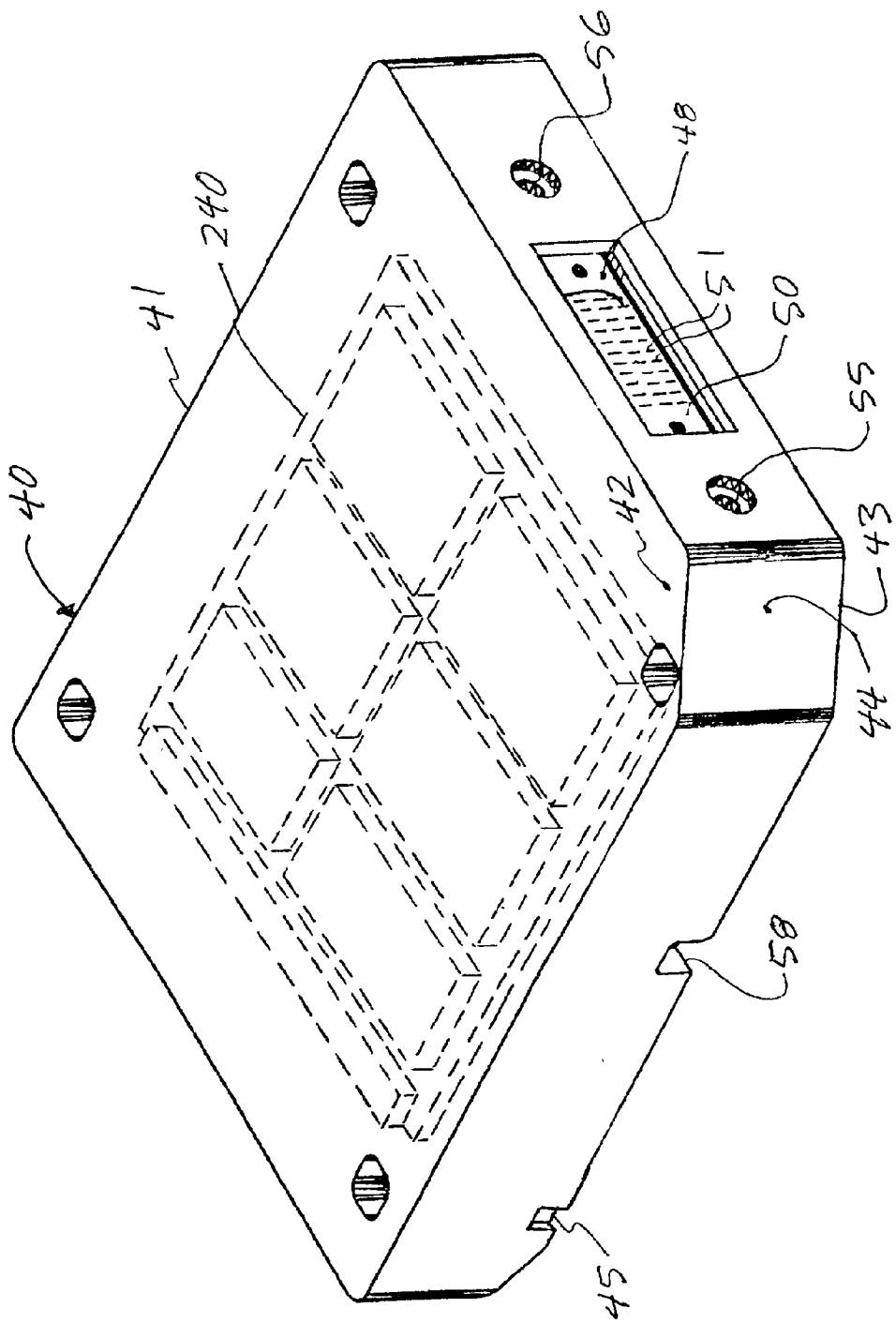
FIG. 24 is a diagrammatic illustration of a portable data storage cartridge of FIG. 3 containing a non-volatile solid state memory assembly.
Figure 25:
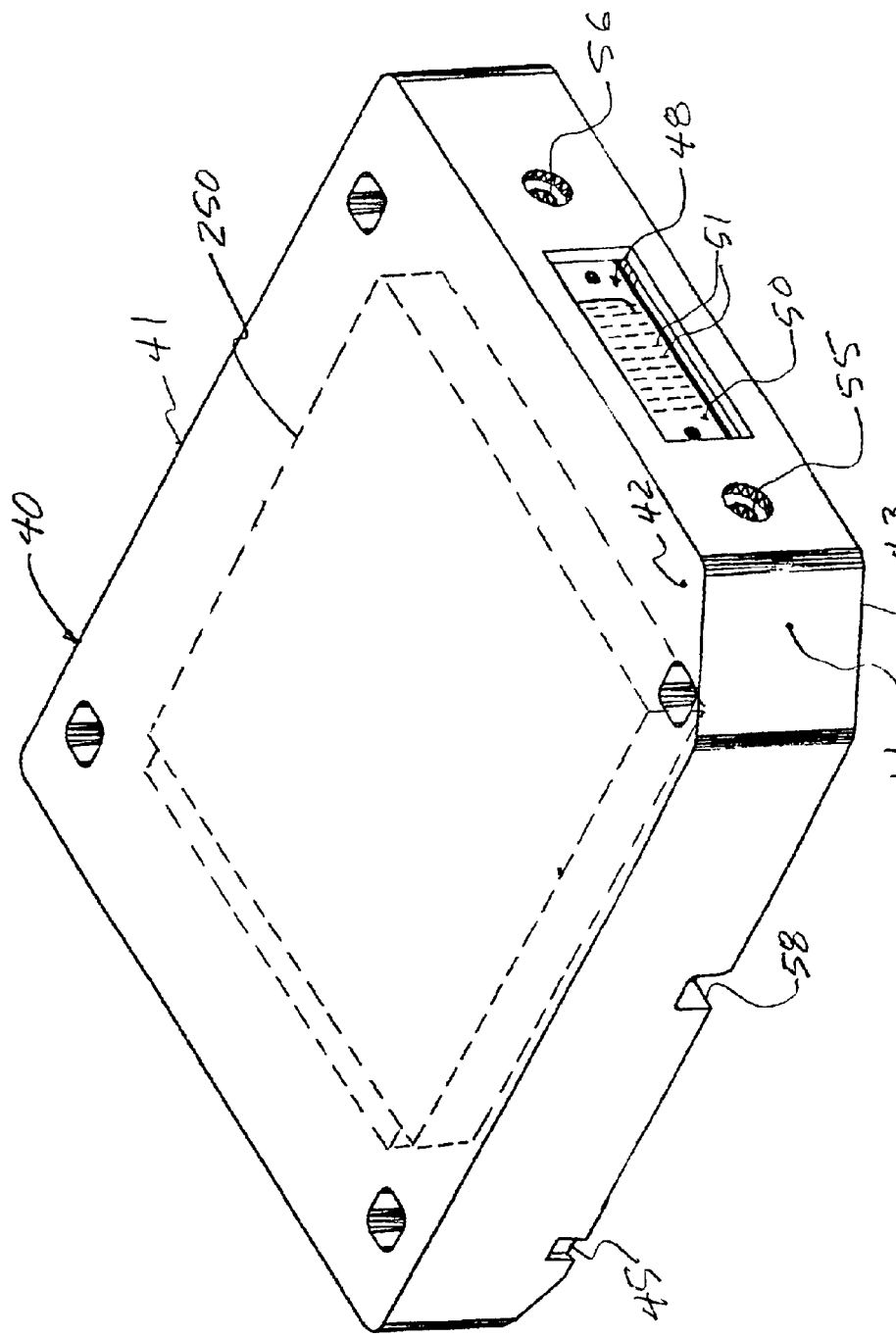
FIG. 25 is a diagrammatic illustration of a portable data storage cartridge of FIG. 3 containing an optical disk drive assembly.

FIGS. 24 and 25 illustrate portable data storage cartridges containing alternative data handling or data storage devices. FIG. 24 illustrates a portable data storage cartridge 40 of FIG. 3 containing a non-volatile solid state memory assembly 240. The solid state memory assembly may advantageously comprise an "off the shelf" device, such as are readily available. FIG. 25 illustrates a portable data storage cartridge of FIG. 3 containing an optical disk drive assembly 250. Currently, commercially available optical disk drives would have to be modified to employ a non-removable optical disk. Other data handling devices may occur to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage cartridge of generally an exterior dimensional form factor of a tape cartridge having a leader block, said leader block comprising a hole therethrough for engagement by a threading pin, said data storage cartridge comprising:
    a data storage device;
    a cartridge shell comprising a substantially identical exterior dimensional form factor as said tape cartridge with said leader block, and comprising a blocking portion on at least one side of said location of said leader block hole, to differentiate identification of said data storage cartridge from said tape cartridge; and
    a compressible shock mount providing a shock absorbing capability supporting and mounting said data storage device within said cartridge shell, said compressible shock mount configured to fully separate and isolate said data storage device from mechanical contact with said cartridge shell.

2. The data storage cartridge of claim 1, for use with a transfer station, said data storage cartridge additionally comprising:
    an external data transfer interface coupled to said data storage device for providing data transfer with respect to said transfer station; and
    a flexible flex cable interconnecting said data storage device and said external data transfer interface, said flexible flex cable configured to a length to provide slack between said data storage device and said external data transfer interface under compression of said compressible shock mount.

3. A data storage cartridge of generally an exterior dimensional form factor of a tape cartridge having a leader block, said leader block comprising a hole therethrough for engagement by a threading pin, said data storage cartridge comprising:
    a data storage device; and
    a cartridge shell comprising a substantially identical exterior dimensional form factor as said tape cartridge with said leader block, and comprising a blocking portion on at least one side of said location of said leader block hole, to differentiate identification of said data storage cartridge from said tape cartridge, said cartridge shell mounting said data storage device therein;
    said data storage cartridge for use with a transfer station, said transfer station having an optical source and sensor for sensing at the location of said leader block hole when a cartridge is at the end of travel in a receiver of said transfer station, wherein said cartridge shell blocking portion is arranged to block said optical source from said sensor when said data storage cartridge is at the end of travel in said receiver, thereby indicating the presence of said data storage cartridge at said end of travel in said receiver, and providing said differentiated identification of said data storage cartridge.

4. The data storage cartridge of claim 3, wherein said blocking portion is additionally located at a side of said location of said leader block hole at which said threading pin begins engagement of said tape cartridges, thereby preventing said engagement of said data storage cartridge and providing said differentiated identification of said data storage cartridge.

5. The data storage cartridge of claim 3, wherein said data storage device comprises a magnetic disk drive assembly.

6. The data storage cartridge of claim 3, wherein said data storage device comprises an optical disk drive assembly.

7. The data storage cartridge of claim 3, wherein said data storage device comprises a non-volatile solid state memory assembly.

8. A data storage cartridge of generally an exterior dimensional form factor of a tape cartridge having a leader block, said leader block comprising a hole therethrough for engagement by a threading pin, said data storage cartridge comprising:
    a data storage device;
    a cartridge shell comprising a substantially identical exterior dimensional form factor as said tape cartridge with said leader block, and comprising a blocking portion on at least one side of said location of said leader block hole, to differentiate identification of said data storage cartridge from said tape cartridge, said cartridge shell mounting said data storage device therein;
    an external data transfer interface coupled to said data storage device for providing data transfer with respect to said transfer station; and
    registration holes at said external data transfer interface for acceptance of alignment pins to register said external data transfer interface with respect to said transfer station, wherein said registration holes are formed in a plastic material having electrical resistivity, said material electrically coupled to said data storage device at a ground thereof, thereby forming an electrostatic discharge path through said material to said alignment pins.

9. A data storage cartridge of generally an exterior dimensional form factor of a tape cartridge having a leader block, said leader block comprising a hole therethrough for engagement by a threading pin, said data storage cartridge comprising:
    a data storage device;
    a cartridge shell comprising a substantially identical exterior dimensional form factor as said tape cartridge with said leader block, and comprising a blocking portion on at least one side of said location of said leader block hole, to differentiate identification of said data storage cartridge from said tape cartridge, said cartridge shell mounting said data storage device therein; and
    an external data transfer interface coupled to said data storage device for providing data transfer with respect to said transfer station, wherein said external data transfer interface additionally comprises a power transfer interface coupled to said data storage device for transferring power from said transfer station to said data storage device.

10. The data storage cartridge of claim 9, wherein said power transfer interface is coupled to said data storage device via said flex cable.

11. A transfer station for providing data transfer with respect to portable data storage cartridges, said data storage cartridge having generally an exterior dimensional form factor of a tape cartridge having a leader block, said leader block comprising a hole therethrough for engagement by a threading pin, said transfer station comprising:

a receiver for receiving said portable data storage cartridge;

an optical source directed toward said location of said leader block hole when a cartridge is at the end of travel in said receiver; and a sensor positioned at the location of said leader block hole at the opposite side of said cartridge from said optical source for sensing the blockage of said optical source by a cartridge shell blocking portion, thereby identifying said differentiated identification of said data storage cartridge, and indicating the presence of said data storage cartridge at said end of travel in said receiver.

12. The transfer station of claim 11, said wherein said optical source comprises an infrared source, and wherein said sensor comprises an infrared sensor.

13. The transfer station of claim 11, wherein said optical source comprises an LED optical source.

14. The transfer station of claim 11, wherein said optical source comprises a focused source, providing a focused beam directed toward said sensor.

15. The transfer station of claim 11, additionally comprising:

a station data transfer interface for mating with an external data transfer interface of said data storage cartridge; and a loading apparatus for positioning said data storage cartridge from said end of travel at said receiver to a position mating said external data transfer interface with said station data transfer interface.

16. The transfer station of claim 15, additionally comprising alignment pins for mating with registration holes of said data storage cartridge to register said external data transfer interface with said station data transfer interface.

17. The transfer station of claim 16, wherein said registration holes of said data storage cartridge are electrically coupled to an electrostatic source therein, and wherein said alignment pins are conductive and coupled to a ground path, thereby forming an electrostatic discharge path from said registration holes of said data storage cartridge to said ground path.

18. The transfer station of claim 15, wherein said external data transfer interface of said data storage cartridge additionally comprises a power transfer interface; and wherein said station data transfer interface additionally comprises:

a station power transfer interface for transferring power from said transfer station to said power transfer interface of said data storage cartridge; and an electrical contact verification detector responsive to a current to said cartridge power transfer interface for verifying electrical contact between said data storage cartridge and said station power transfer interface.

19. The transfer station of claim 18, wherein said station power transfer interface additionally comprises a ramping circuit, and is responsive to said verification of said electrical contact by said electrical contact verification detector, for thereupon gradually ramping the application of power to said power transfer interface of said data storage cartridge.

20. An automated data storage library comprising:

a plurality of storage shelves for storing portable data storage cartridges, some of said portable data storage cartridges comprising data storage media cartridges containing data storage media, and some of said cartridges comprising magnetic disk drive cartridges containing magnetic disk drives;

at least one data storage drive for reading and/or writing data on said data storage media of said data storage media cartridges;

at least one transfer station for providing data transfer with respect to said magnetic disk drive cartridges; and at least one robot accessor for gripping and transporting said portable data storage cartridges amongst said storage shelves, said at least one data storage drive, and said at least one transfer station.

21. The automated data storage library of claim 20, wherein said data storage media cartridges and said magnetic disk drive cartridges comprise a substantially identical exterior dimensional form factor, and wherein said at least one robot accessor comprises a gripper for identically gripping said data storage media cartridges and said magnetic disk drive cartridges.

22. The automated data storage library of claim 20, wherein said transfer station additionally comprises:

a station data transfer interface for mating with an external data transfer interface of said magnetic disk drive cartridge; and a loading apparatus for positioning said magnetic disk drive cartridge to a position mating said external data transfer interface with said station data transfer interface.

23. The automated data storage library of claim 22, wherein said transfer station additionally comprises alignment pins for mating with registration holes of said magnetic disk drive cartridge to register said external data transfer interface with said station data transfer interface.

24. The automated data storage library of claim 23, wherein said registration holes of said magnetic disk drive cartridge are electrically coupled to an electrostatic source thereof, and wherein said transfer station alignment pins are conductive and coupled to a ground path, thereby forming an electrostatic discharge path from said registration holes of said magnetic disk drive cartridge to said ground path.

25. The automated data storage library of claim 22, wherein said external data transfer interface of said magnetic disk drive cartridge additionally comprises a power transfer interface; and wherein said station data transfer interface additionally comprises:

a station power transfer interface for transferring power from said transfer station to said power transfer interface of said magnetic disk drive cartridge; and an electrical contact verification detector responsive to a current to said cartridge power transfer interface for verifying electrical contact between said magnetic disk drive cartridge and said station power transfer interface.

26. The automated data storage library of claim 25, wherein said station power transfer interface additionally comprises a ramping circuit, and is responsive to said verification of said electrical contact by said electrical contact verification detector, for thereupon gradually ramping the application of power to said power transfer interface of said magnetic disk drive cartridge.

27. A portable magnetic disk drive cartridge, comprising:
a cartridge shell;
an encased, self-contained, magnetic disk drive assembly having a rear end;
an external data transfer interface for providing data transfer with respect to a transfer station, said external data transfer interface mounted at said cartridge shell;
a shock mount supporting and mounting said encased magnetic disk drive assembly within said cartridge shell, said encased magnetic disk drive assembly positioned such that said rear end is opposite said external data transfer interface; and
a flex cable interconnecting said rear end of said encased magnetic disk drive assembly with said external data transfer interface, said shock mount and said flex cable mechanically isolating said encased magnetic disk drive assembly from said cartridge shell.

28. The portable magnetic disk drive cartridge of claim 27, for use with an automated data storage library which is capable of storing portable data storage media cartridges in storage shelves and having at least one robot accessor for gripping and transporting said portable data storage cartridges; wherein said cartridge shell comprises an exterior dimensional form factor for storage in said storage shelves and gripping by said robot accessor; and wherein said external data transfer interface is mounted at said cartridge shell and coupled to said encased magnetic disk drive assembly for providing data transfer with respect to said automated data storage library.

29. The portable magnetic disk drive cartridge of claim 28, wherein said cartridge shell comprises a substantially identical exterior dimensional form factor as said portable data storage media cartridges.

30. The portable magnetic disk drive cartridge of claim 27, wherein said transfer station provides data transfer with respect to said portable magnetic disk drive cartridges, and comprises a plurality of alignment pins, and said portable magnetic disk drive cartridge additionally comprising a plurality of registration holes at said external data transfer interface for acceptance of said alignment pins to register said external data transfer interface with respect to said transfer station.

31. The portable magnetic disk drive cartridge of claim 30, wherein said registration holes are formed in a plastic material having electrical resistivity, said material electrically coupled to said magnetic disk drive assembly at a ground thereof, thereby forming an electrostatic discharge path through said material to said alignment pins.

32. The portable magnetic disk drive cartridge of claim 27, wherein said external data transfer interface additionally comprises a power transfer interface coupled to said encased magnetic disk drive assembly for transferring power from said transfer station to said encased magnetic disk drive assembly.

33. The portable magnetic disk drive cartridge of claim 32, wherein said power transfer interface is coupled to said encased magnetic disk drive assembly via said flex cable.

34. A portable magnetic disk drive cartridge for use with an automated data storage library which is capable of storing portable data storage media cartridges in storage shelves and having at least one robot accessor for gripping and transporting said portable data storage cartridges, comprising:
a cartridge shell comprising an exterior dimensional form factor for storage in said storage shelves and gripping by said robot accessor;
an encased magnetic disk drive assembly mounted in said cartridge shell; and
an external data transfer interface coupled to said encased magnetic disk drive assembly for providing data transfer with respect to said automated data storage library.

35. The portable magnetic disk drive cartridge of claim 34, wherein said cartridge shell comprises a substantially identical exterior dimensional form factor as said portable data storage media cartridges.

36. The portable magnetic disk drive cartridge of claim 35, herein said automated data storage library provides data transfer with respect to said portable magnetic disk drive cartridges at a transfer station, said transfer station comprising a plurality of alignment pins, and said portable magnetic disk drive cartridge additionally comprising a plurality of registration holes at said external data transfer interface for acceptance of said alignment pins to register said external data transfer interface with respect to said transfer station.

37. The portable magnetic disk drive cartridge of claim 36, wherein said registration holes are formed in a plastic material having electrical resistivity, said material electrically coupled to said magnetic disk drive assembly at a ground thereof, thereby forming an electrostatic discharge path through said material to said alignment pins.

38. The portable magnetic disk drive cartridge of claim 35, wherein said automated data storage library provides data transfer with respect to said portable magnetic disk drive cartridges at a transfer station, and wherein said external data transfer interface of said portable magnetic disk drive cartridge additionally comprises a power transfer interface coupled to said encased magnetic disk drive assembly for transferring power from said transfer station to said encased magnetic disk drive assembly.

39. The portable magnetic disk drive cartridge of claim 40, wherein said power transfer interface additionally comprises a flex cable interconnecting said encased magnetic disk drive and said external data transfer interface for transferring said power to said encased magnetic disk drive assembly.

40. A transfer station for providing data transfer with respect to portable magnetic disk drive cartridges which house a magnetic disk drive, comprising:
a station data transfer interface for mating with an external data transfer interface of said magnetic disk drive cartridge;
a loading apparatus for positioning said magnetic disk drive cartridge to a position mating said external data transfer interface with said station data transfer interface; and
a plurality of alignment pins for mating with a corresponding plurality of registration holes of said magnetic disk drive cartridge to register said external data transfer interface with said station data transfer interface, wherein said registration holes of said magnetic disk drive cartridge are electrically coupled to an electrostatic source thereof, and wherein said transfer station alignment pins are conductive and coupled to a ground path, thereby forming an electrostatic discharge path from said registration holes of said magnetic disk drive cartridge to said ground path.

41. A transfer station for providing data transfer with respect to portable magnetic disk drive cartridges which house a magnetic disk drive, comprising:
a station data transfer interface for mating with an external data transfer interface of said magnetic disk drive cartridge; and
a loading apparatus for positioning said magnetic disk drive cartridge to a position mating said external data transfer interface with said station data transfer interface;
wherein said external data transfer interface of said magnetic disk drive cartridge additionally comprises a power transfer interface; and wherein said station data transfer interface additionally comprises:

a station power transfer interface for transferring power from said transfer station to said power transfer interface of said magnetic disk drive cartridge; and an electrical contact verification detector responsive to a current to said cartridge power transfer interface for verifying electrical contact between said magnetic disk drive cartridge and said station power transfer interface.

42. The transfer station of claim 41, wherein said station power transfer interface additionally comprises a ramping circuit, and is responsive to said verification of said electrical contact by said electrical contact verification detector, for thereupon gradually ramping the application of power to said power transfer interface of said magnetic disk drive cartridge.

* * * * *